US012437250B2

(12) United States Patent
Pohle et al.

(10) Patent No.: US 12,437,250 B2
(45) Date of Patent: Oct. 7, 2025

(54) MULTI-DIMENSIONAL PROCESS MINING AND ANALYSIS

(71) Applicant: ServiceNow, Inc., Santa Clara, CA (US)

(72) Inventors: Hans Joachim Gerhard Pohle, Amsterdam (NL); Manjeet Singh, Santa Clara, CA (US); Bojan Tomić, Amsterdam (NL); Vadim Denisov, Amsterdam (NL); Ciprian Mocanu, Amsterdam (NL); Andrei Vlad Olteanu, Amsterdam (NL)

(73) Assignee: ServiceNow, Inc., Santa Clara, CA (US)

( * ) Notice: Subject to any disclaimer, the term of this patent is extended or adjusted under 35 U.S.C. 154(b) by 437 days.

(21) Appl. No.: 17/558,474

(22) Filed: Dec. 21, 2021

(65) Prior Publication Data

US 2023/0196240 A1    Jun. 22, 2023

(51) Int. Cl.
*G06Q 10/0633* (2023.01)
*G06F 9/54* (2006.01)

(52) U.S. Cl.
CPC ......... *G06Q 10/0633* (2013.01); *G06F 9/542* (2013.01)

(58) Field of Classification Search
CPC .................. G06Q 10/063; G06Q 10/0633
See application file for complete search history.

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| EP | 0433979 | 6/1991 |
| EP | 1607824 | 12/2005 |

(Continued)

OTHER PUBLICATIONS

Kalenkova, A. A., van der Aalst, Wil M, , P., Lomazova, I. A., & Rubin, V. A. (2017). Process mining using BPMN: Relating event logs and process models. Software and Systems Modeling, 16(4), 1019-1048. (Year: 2017).*

(Continued)

*Primary Examiner* — William S Brockington, III
(74) *Attorney, Agent, or Firm* — McDonnell Boehnen Hulbert & Berghoff LLP

(57) ABSTRACT

An embodiment involves receiving a request specifying a particular process, wherein an event table associates event identifiers of events, process identifiers of processes that generated to the events, timestamps of times when the events occurred, states of the processes at the times, and references to related processes; generating nodes of a graph, wherein the particular process and each of its related processes are represented by entity nodes annotated with respective process identifiers, and the events are represented by event nodes annotated with respective event identifiers; generating edges between the entity nodes and the event nodes for which the events of the event nodes either were: generated by the processes represented by the entity nodes, or refer to the processes represented by the entity nodes; and generating edges between pairs of the event nodes that: generated by a common process, and the events of which occurred sequentially according to their timestamps.

18 Claims, 21 Drawing Sheets

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 11,089,115 B2 | 8/2021 | Garty et al. |
| 11,095,506 B1 | 8/2021 | Erblat et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2014/0035922 A1* | 2/2014 | Watt .................... G06T 19/20 345/440 |
| 2016/0188769 A1* | 6/2016 | Aylott .................... G06Q 50/06 703/6 |
| 2017/0288974 A1* | 10/2017 | Yoshihira ................ H04L 41/12 |
| 2018/0123940 A1 | 5/2018 | Rimar et al. |
| 2018/0222043 A1* | 8/2018 | Trovero ................ G06F 16/285 |
| 2019/0104398 A1 | 4/2019 | Owen et al. |
| 2019/0377818 A1* | 12/2019 | Andritsos ........... G06F 16/2465 |
| 2020/0050689 A1 | 2/2020 | Tal et al. |
| 2020/0204443 A1 | 6/2020 | Bar Oz et al. |
| 2020/0396231 A1* | 12/2020 | Krebs ................. H04L 63/1425 |
| 2021/0194764 A1 | 6/2021 | Badyan et al. |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |
| WO | WO-2020201830 A1 * | 10/2020 |

OTHER PUBLICATIONS

Stefan Esser and Dirk Fahland, Multi-Dimensional Event Data in Graph Databases Representing, Querying, and Process Mining, downloaded from https://arxiv.org/abs/2005.14552, Apr. 3, 2021 (51 pages).

J. Leander, Automated Translation of Event Data from Relational to Graph Databases, Department of Mathematics and Computer Science, Eindhoven University of Technology, Master Thesis, May 2020 (92 pages).

OCEL Standard, downloaded from https://ocel-standard.org, Nov. 4, 2021 (1 page).

(56) References Cited

OTHER PUBLICATIONS

IEEE, Draft Standard for XES—extensible Event Stream—for achieving interoperability in event logs and event streams, P1849/D03, Jun. 2016 (58 pages).

* cited by examiner

| process | id | attribute name | attribute value |
|---|---|---|---|
| C | $C_1$ | state | r |
| C | $C_1$ | GID | $G_1$ |
| C | $C_1$ | createdOn | 1 |
| C | $C_1$ | createdBy | $user_1$ |
| P | $P_1$ | state | r |
| P | $P_1$ | GID | $\perp$ |
| P | $P_1$ | createdOn | 1 |
| P | $P_1$ | createdBy | $user_1$ |
| I | $I_1$ | state | r |
| I | $I_1$ | CID | $\perp$ |
| I | $I_1$ | PID | $P_1$ |
| I | $I_1$ | createdOn | 5 |
| I | $I_1$ | createdBy | $user_1$ |
| T | $T_1$ | state | r |
| T | $T_1$ | IID | $I_1$ |
| T | $T_1$ | createdOn | 8 |
| T | $T_1$ | createdBy | $user_1$ |
| T | $T_2$ | state | r |
| T | $T_2$ | IID | $I_1$ |
| T | $T_2$ | createdOn | 8 |
| T | $T_2$ | createdBy | $user_1$ |

| id | trans | name | old | new | time | piId | process | res |
|---|---|---|---|---|---|---|---|---|
| $a_2$ | 2 | state | n | w | 2 | $C_1$ | C | $user_1$ |
| $a_3$ | 3 | state | w | h | 6 | $C_1$ | C | $user_1$ |
| $a_4$ | 3 | GID | ⊥ | $G_1$ | 6 | $C_1$ | C | $user_1$ |
| $a_5$ | 4 | state | h | r | 15 | $C_1$ | C | $user_1$ |
| $a_7$ | 6 | state | n | w | 2 | $P_1$ | P | $user_1$ |
| $a_8$ | 7 | state | w | r | 15 | $P_1$ | P | $user_1$ |
| $a_9$ | 8 | state | n | w | 7 | $I_1$ | I | $user_1$ |
| $a_{10}$ | 9 | CID | $C_1$ | ⊥ | 11 | $I_1$ | I | $user_1$ |
| $a_{11}$ | 9 | PID | ⊥ | $P_1$ | 11 | $I_1$ | I | $user_1$ |
| $a_{12}$ | 10 | state | w | r | 13 | $I_1$ | I | $user_1$ |
| $a_{13}$ | 11 | state | n | w | 9 | $T_1$ | T | $user_1$ |
| $a_{14}$ | 12 | state | w | r | 12 | $T_1$ | T | $user_1$ |
| $a_{15}$ | 13 | state | n | w | 9 | $T_2$ | T | $user_1$ |
| $a_{16}$ | 14 | state | w | r | 12 | $T_2$ | T | $user_1$ |

1302

FIG. 13B

| event ID | state | time | id | process | CID | PID | IID | TID | GID |
|---|---|---|---|---|---|---|---|---|---|
| $e_2$ | n | 1 | $C_1$ | C | ⊥ | ⊥ | ⊥ | ⊥ | ⊥ |
| $e_3$ | w | 2 | $C_1$ | C | ⊥ | ⊥ | ⊥ | ⊥ | ⊥ |
| $e_5$ | h | 6 | $C_1$ | C | ⊥ | ⊥ | ⊥ | ⊥ | $G_1$ |
| $e_6$ | r | 15 | $C_1$ | C | ⊥ | ⊥ | ⊥ | ⊥ | ⊥ |
| $e_9$ | n | 1 | $P_1$ | P | ⊥ | ⊥ | ⊥ | ⊥ | ⊥ |
| $e_{10}$ | w | 2 | $P_1$ | P | ⊥ | ⊥ | ⊥ | ⊥ | ⊥ |
| $e_{11}$ | r | 15 | $P_1$ | P | ⊥ | ⊥ | ⊥ | ⊥ | ⊥ |
| $e_{14}$ | n | 5 | $I_1$ | I | $C_1$ | ⊥ | ⊥ | ⊥ | ⊥ |
| $e_{15}$ | w | 7 | $I_1$ | I | ⊥ | ⊥ | ⊥ | ⊥ | ⊥ |
| $e_{16}$ | ⊥ | 11 | $I_1$ | I | ⊥ | $P_1$ | ⊥ | ⊥ | ⊥ |
| $e_{17}$ | r | 13 | $I_1$ | I | ⊥ | ⊥ | ⊥ | ⊥ | ⊥ |
| $e_{20}$ | n | 8 | $T_1$ | T | ⊥ | ⊥ | $I_1$ | ⊥ | ⊥ |
| $e_{21}$ | w | 9 | $T_1$ | T | ⊥ | ⊥ | ⊥ | ⊥ | ⊥ |
| $e_{22}$ | r | 12 | $T_1$ | T | ⊥ | ⊥ | ⊥ | ⊥ | ⊥ |
| $e_{25}$ | n | 8 | $T_2$ | T | ⊥ | ⊥ | $I_1$ | ⊥ | ⊥ |
| $e_{26}$ | w | 9 | $T_2$ | T | ⊥ | ⊥ | ⊥ | ⊥ | ⊥ |
| $e_{27}$ | r | 12 | $T_2$ | T | ⊥ | ⊥ | ⊥ | ⊥ | ⊥ |

1304

| event ID | state | time | id | process | CID | PID | IID | TID | GID | artType |
|---|---|---|---|---|---|---|---|---|---|---|
| $e_1$ | n | 1 | $C_1$ | C | ⊥ | ⊥ | ⊥ | ⊥ | ⊥ | artStart |
| $e_2$ | n | 1 | $C_1$ | C | ⊥ | ⊥ | ⊥ | ⊥ | ⊥ | ⊥ |
| $e_3$ | w | 2 | $C_1$ | C | ⊥ | ⊥ | ⊥ | ⊥ | ⊥ | ⊥ |
| $e_5$ | h | 6 | $C_1$ | C | ⊥ | ⊥ | ⊥ | ⊥ | $G_1$ | ⊥ |
| $e_6$ | r | 15 | $C_1$ | C | ⊥ | ⊥ | ⊥ | ⊥ | ⊥ | ⊥ |
| $e_7$ | r | 15 | $C_1$ | C | ⊥ | ⊥ | ⊥ | ⊥ | ⊥ | artEnd |
| $e_8$ | n | 1 | $P_1$ | P | ⊥ | ⊥ | ⊥ | ⊥ | ⊥ | artStart |
| $e_9$ | n | 1 | $P_1$ | P | ⊥ | ⊥ | ⊥ | ⊥ | ⊥ | ⊥ |
| $e_{10}$ | w | 2 | $P_1$ | P | ⊥ | ⊥ | ⊥ | ⊥ | ⊥ | ⊥ |
| $e_{11}$ | r | 15 | $P_1$ | P | ⊥ | ⊥ | ⊥ | ⊥ | ⊥ | ⊥ |
| $e_{12}$ | r | 15 | $P_1$ | P | ⊥ | ⊥ | ⊥ | ⊥ | ⊥ | artEnd |
| $e_{13}$ | n | 5 | $I_1$ | I | $C_1$ | ⊥ | ⊥ | ⊥ | ⊥ | artStart |
| $e_{14}$ | n | 5 | $I_1$ | I | $C_1$ | ⊥ | ⊥ | ⊥ | ⊥ | ⊥ |
| $e_{15}$ | w | 7 | $I_1$ | I | ⊥ | ⊥ | ⊥ | ⊥ | ⊥ | ⊥ |
| $e_{16}$ | ⊥ | 11 | $I_1$ | I | ⊥ | $P_1$ | ⊥ | ⊥ | ⊥ | ⊥ |
| $e_{17}$ | r | 13 | $I_1$ | I | ⊥ | ⊥ | ⊥ | ⊥ | ⊥ | ⊥ |
| $e_{18}$ | r | 13 | $I_1$ | I | ⊥ | ⊥ | ⊥ | ⊥ | ⊥ | artEnd |
| $e_{19}$ | n | 8 | $T_1$ | T | ⊥ | ⊥ | $I_1$ | ⊥ | ⊥ | artStart |
| $e_{20}$ | n | 8 | $T_1$ | T | ⊥ | ⊥ | $I_1$ | ⊥ | ⊥ | ⊥ |
| $e_{21}$ | w | 9 | $T_1$ | T | ⊥ | ⊥ | ⊥ | ⊥ | ⊥ | ⊥ |
| $e_{22}$ | r | 12 | $T_1$ | T | ⊥ | ⊥ | ⊥ | ⊥ | ⊥ | ⊥ |
| $e_{23}$ | r | 12 | $T_1$ | T | ⊥ | ⊥ | ⊥ | ⊥ | ⊥ | artEnd |
| $e_{24}$ | n | 8 | $T_2$ | T | ⊥ | ⊥ | $I_1$ | ⊥ | ⊥ | artStart |
| $e_{25}$ | n | 8 | $T_2$ | T | ⊥ | ⊥ | $I_1$ | ⊥ | ⊥ | ⊥ |
| $e_{26}$ | w | 9 | $T_2$ | T | ⊥ | ⊥ | ⊥ | ⊥ | ⊥ | ⊥ |
| $e_{27}$ | r | 12 | $T_2$ | T | ⊥ | ⊥ | ⊥ | ⊥ | ⊥ | ⊥ |
| $e_{28}$ | r | 12 | $T_2$ | T | ⊥ | ⊥ | ⊥ | ⊥ | ⊥ | artEnd |

| event ID | state | time | id | process | CID | PID | IID | TID | GID | artType |
|---|---|---|---|---|---|---|---|---|---|---|
| $e_1$ | n | 1 | $C_1$ | C | ⊥ | ⊥ | ⊥ | ⊥ | ⊥ | artStart |
| $e_2$ | n | 1 | $C_1$ | C | ⊥ | ⊥ | ⊥ | ⊥ | ⊥ | ⊥ |
| $e_3$ | w | 2 | $C_1$ | C | ⊥ | ⊥ | ⊥ | ⊥ | ⊥ | ⊥ |
| $e_5$ | h | 6 | $C_1$ | C | ⊥ | ⊥ | ⊥ | ⊥ | $G_1$ | ⊥ |
| $e_6$ | r | 15 | $C_1$ | C | ⊥ | ⊥ | ⊥ | ⊥ | $G_1^{PRO}$ | ⊥ |
| $e_7$ | r | 15 | $C_1$ | C | ⊥ | ⊥ | ⊥ | ⊥ | $G_1^{PRO}$ | artEnd |
| $e_8$ | n | 1 | $P_1$ | P | ⊥ | ⊥ | ⊥ | ⊥ | ⊥ | artStart |
| $e_9$ | n | 1 | $P_1$ | P | ⊥ | ⊥ | ⊥ | ⊥ | ⊥ | ⊥ |
| $e_{10}$ | w | 2 | $P_1$ | P | ⊥ | ⊥ | ⊥ | ⊥ | ⊥ | ⊥ |
| $e_{11}$ | r | 15 | $P_1$ | P | ⊥ | ⊥ | ⊥ | ⊥ | ⊥ | ⊥ |
| $e_{12}$ | r | 15 | $P_1$ | P | ⊥ | ⊥ | ⊥ | ⊥ | ⊥ | artEnd |
| $e_{13}$ | n | 5 | $I_1$ | I | $C_1$ | ⊥ | ⊥ | ⊥ | ⊥ | artStart |
| $e_{14}$ | n | 5 | $I_1$ | I | $C_1$ | ⊥ | ⊥ | ⊥ | ⊥ | ⊥ |
| $e_{15}$ | w | 7 | $I_1$ | I | $C_1^{PRO}$ | ⊥ | ⊥ | ⊥ | ⊥ | ⊥ |
| $e_{16}$ | w | 11 | $I_1$ | I | ⊥ | $P_1$ | ⊥ | ⊥ | ⊥ | ⊥ |
| $e_{17}$ | r | 13 | $I_1$ | I | ⊥ | $P_1^{PRO}$ | ⊥ | ⊥ | ⊥ | ⊥ |
| $e_{18}$ | r | 13 | $I_1$ | I | ⊥ | $P_1^{PRO}$ | ⊥ | ⊥ | ⊥ | artEnd |
| $e_{19}$ | n | 8 | $T_1$ | T | ⊥ | ⊥ | $I_1$ | ⊥ | ⊥ | artStart |
| $e_{20}$ | n | 8 | $T_1$ | T | ⊥ | ⊥ | $I_1$ | ⊥ | ⊥ | ⊥ |
| $e_{21}$ | w | 9 | $T_1$ | T | ⊥ | ⊥ | $I_1^{PRO}$ | ⊥ | ⊥ | ⊥ |
| $e_{22}$ | r | 12 | $T_1$ | T | ⊥ | ⊥ | $I_1^{PRO}$ | ⊥ | ⊥ | ⊥ |
| $e_{23}$ | r | 12 | $T_1$ | T | ⊥ | ⊥ | $I_1^{PRO}$ | ⊥ | ⊥ | artEnd |
| $e_{24}$ | n | 8 | $T_2$ | T | ⊥ | ⊥ | $I_1$ | ⊥ | ⊥ | artStart |
| $e_{25}$ | n | 8 | $T_2$ | T | ⊥ | ⊥ | $I_1$ | ⊥ | ⊥ | ⊥ |
| $e_{26}$ | w | 9 | $T_2$ | T | ⊥ | ⊥ | $I_1^{PRO}$ | ⊥ | ⊥ | ⊥ |
| $e_{27}$ | r | 12 | $T_2$ | T | ⊥ | ⊥ | $I_1^{PRO}$ | ⊥ | ⊥ | ⊥ |
| $e_{28}$ | r | 12 | $T_2$ | T | ⊥ | ⊥ | $I_1^{PRO}$ | ⊥ | ⊥ | artEnd |

| event ID | state | act | time | id | process | CID | PID | IID | TID | GID | artType | relEv |
|---|---|---|---|---|---|---|---|---|---|---|---|---|
| $e_1$ | n | $state_x$ | 1 | $C_1$ | C | ⊥ | ⊥ | ⊥ | ⊥ | ⊥ | artStart | ⊥ |
| $e_2$ | n | $state_n$ | 1 | $C_1$ | C | ⊥ | ⊥ | ⊥ | ⊥ | ⊥ | ⊥ | ⊥ |
| $e_3$ | w | $state_w$ | 2 | $C_1$ | C | ⊥ | ⊥ | ⊥ | ⊥ | ⊥ | ⊥ | ⊥ |
| $e_4$ | h | $state_h$ | 6 | $C_1$ | C | ⊥ | ⊥ | ⊥ | ⊥ | $G_1$ | ⊥ | $e_5$ |
| $e_5$ | h | $group_{G1}$ | 6 | $C_1$ | C | ⊥ | ⊥ | ⊥ | ⊥ | $G_1$ | ⊥ | ⊥ |
| $e_6$ | r | $state_r$ | 15 | $C_1$ | C | ⊥ | ⊥ | ⊥ | ⊥ | $G_1^{PRO}$ | ⊥ | ⊥ |
| $e_7$ | r | $state_c$ | 15 | $C_1$ | C | ⊥ | ⊥ | ⊥ | ⊥ | $G_1^{PRO}$ | artEnd | ⊥ |
| $e_8$ | n | $state_x$ | 1 | $P_1$ | P | ⊥ | ⊥ | ⊥ | ⊥ | ⊥ | artStart | ⊥ |
| $e_9$ | n | $state_n$ | 1 | $P_1$ | P | ⊥ | ⊥ | ⊥ | ⊥ | ⊥ | ⊥ | ⊥ |
| $e_{10}$ | w | $state_w$ | 2 | $P_1$ | P | ⊥ | ⊥ | ⊥ | ⊥ | ⊥ | ⊥ | ⊥ |
| $e_{11}$ | r | $state_r$ | 15 | $P_1$ | P | ⊥ | ⊥ | ⊥ | ⊥ | ⊥ | ⊥ | ⊥ |
| $e_{12}$ | r | $state_c$ | 15 | $P_1$ | P | ⊥ | ⊥ | ⊥ | ⊥ | ⊥ | artEnd | ⊥ |
| $e_{13}$ | n | $state_x$ | 5 | $I_1$ | I | $C_1$ | ⊥ | ⊥ | ⊥ | ⊥ | artStart | ⊥ |
| $e_{14}$ | n | $state_n$ | 5 | $I_1$ | I | $C_1$ | ⊥ | ⊥ | ⊥ | ⊥ | ⊥ | ⊥ |
| $e_{15}$ | w | $state_w$ | 7 | $I_1$ | I | $C_1$ | ⊥ | ⊥ | ⊥ | ⊥ | ⊥ | ⊥ |
| $e_{16}$ | w | $problem_{P1}$ | 11 | $I_1$ | I | ⊥ | $P_1$ | ⊥ | ⊥ | ⊥ | ⊥ | ⊥ |
| $e_{17}$ | r | $state_r$ | 13 | $I_1$ | I | ⊥ | $P_1^{PRO}$ | ⊥ | ⊥ | ⊥ | ⊥ | ⊥ |
| $e_{18}$ | r | $state_c$ | 13 | $I_1$ | I | ⊥ | $P_1^{PRO}$ | ⊥ | ⊥ | ⊥ | artEnd | ⊥ |
| $e_{19}$ | n | $state_x$ | 8 | $T_1$ | T | ⊥ | ⊥ | $I_1$ | ⊥ | ⊥ | artStart | ⊥ |
| $e_{20}$ | n | $state_n$ | 8 | $T_1$ | T | ⊥ | ⊥ | $I_1$ | ⊥ | ⊥ | ⊥ | ⊥ |
| $e_{21}$ | w | $state_w$ | 9 | $T_1$ | T | ⊥ | ⊥ | $I_1^{PRO}$ | ⊥ | ⊥ | ⊥ | ⊥ |
| $e_{22}$ | r | $state_r$ | 12 | $T_1$ | T | ⊥ | ⊥ | $I_1^{PRO}$ | ⊥ | ⊥ | ⊥ | ⊥ |
| $e_{23}$ | r | $state_c$ | 12 | $T_1$ | T | ⊥ | ⊥ | $I_1^{PRO}$ | ⊥ | ⊥ | artEnd | ⊥ |
| $e_{24}$ | n | $state_x$ | 8 | $T_2$ | T | ⊥ | ⊥ | $I_1$ | ⊥ | ⊥ | artStart | ⊥ |
| $e_{25}$ | n | $state_n$ | 8 | $T_2$ | T | ⊥ | ⊥ | $I_1$ | ⊥ | ⊥ | ⊥ | ⊥ |
| $e_{26}$ | w | $state_w$ | 9 | $T_2$ | T | ⊥ | ⊥ | $I_1^{PRO}$ | ⊥ | ⊥ | ⊥ | ⊥ |
| $e_{27}$ | r | $state_r$ | 12 | $T_2$ | T | ⊥ | ⊥ | $I_1^{PRO}$ | ⊥ | ⊥ | ⊥ | ⊥ |
| $e_{28}$ | r | $state_c$ | 12 | $T_2$ | T | ⊥ | ⊥ | $I_1^{PRO}$ | ⊥ | ⊥ | artEnd | ⊥ |

MULTI-DIMENSIONAL PROCESS MINING AND ANALYSIS

BACKGROUND

Modern organizations are complex entities with multiple divisions, departments, and units carrying out various operations. The workflows for these operations are referred to as processes, and often represented as graphs or state machines. Work items flow through such a process in different patterns. Process analysis involves to study of these patterns in order to find inefficiencies that can be addressed (latencies, cycles, opportunities for automation) in order to improve the overall performance of a process. Currently, process analysis is carried out on a process-by-process basis. But, in reality, there are dependencies between different processes, such that the flow of a work item through one process may be impact by the flow of a related work item through another process. Thus, the analysis of each process individually may obscure the true root cause of process inefficiencies.

SUMMARY

The embodiments herein overcome these and possibly other limitations by employing multi-dimensional process mining and analysis. Recently, labeled property graphs (LPGs) were introduced as a way to represent multi-dimensional event data related to multiple interrelated processes. In practice, however, an LPG representing a medium-to-large extent of event data requires an excessively large amount of memory for its graph database. Further, such an LPG also requires a significant amount of processing time to construct. These factors limit the real-world use of LPGs to unrealistically small datasets.

In order to conduct multi-dimensional process mining and analysis in complex, real-world settings, the embodiments herein provide techniques for constructing process instance-centric LPGs (PICLPGs), each a sub-graph of an LPG that preserves the information about one process instance of interest and its context (i.e., information about directly related instances of other processes). Particularly, PICLPGs are constructed directly from databases without the need to build a full LPG. This approach can be used with real-world multi-dimensional event data of large organizations, and requires only a moderate amount of memory while being capable of answering actual analysis questions regarding processes of interest.

Accordingly, a first example embodiment may involve persistent storage containing an event table, wherein the event table contains a plurality of entries, wherein each of the plurality of entries associates event identifiers of events, process identifiers of processes that generated to the events, timestamps of times when the events occurred, states of the processes at the times, and references to any related processes. One or more processors may be configured to: receive a request specifying a particular process of the processes; generate, from the event table, nodes of a graph, wherein the particular process and each of its related processes are represented by entity nodes that are annotated with their respective process identifiers, and wherein the events are represented by event nodes that are annotated with their respective event identifiers; generate, from the event table, a first set of edges between the nodes of the graph, wherein the first set of edges are between the entity nodes and the event nodes for which the events represented by the event nodes either: were generated by the processes represented by the entity nodes, or refer to the processes represented by the entity nodes in the related processes; generate, from the event table, a second set of edges between the nodes of the graph, wherein the second set of edges are between pairs of the event nodes that: were generated by a common process, and the events of which occurred sequentially according to their timestamps; and provide, in response to the request, a representation of the graph.

A second example embodiment may involve receiving a request specifying a particular process of a set of processes, wherein persistent storage contains an event table, wherein the event table contains a plurality of entries, wherein each of the plurality of entries associates event identifiers of events, process identifiers of the processes that generated to the events, timestamps of times when the events occurred, states of the processes at the times, and references to any related processes. The second example embodiment may involve generating, from the event table, nodes of a graph, wherein the particular process and each of its related processes are represented by entity nodes that are annotated with their respective process identifiers, and wherein the events are represented by event nodes that are annotated with their respective event identifiers. The second example embodiment may involve generating, from the event table, a first set of edges between the nodes of the graph, wherein the first set of edges are between the entity nodes and the event nodes for which the events represented by the event nodes either: were generated by the processes represented by the entity nodes, or refer to the processes represented by the entity nodes in the related processes. The second example embodiment may involve generating, from the event table, a second set of edges between the nodes of the graph, wherein the second set of edges are between pairs of the event nodes that: were generated by a common process, and the events of which occurred sequentially according to their timestamps. The second example embodiment may involve providing, in response to the request, a representation of the graph.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 13A depicts a snapshot record table, in accordance with example embodiments.

FIG. 13B depicts an audit record table, in accordance with example embodiments.

FIG. 13D depicts an input event table with artificial start and end events, in accordance with example embodiments.

FIG. 13E depicts an input event table with artificial start and end events, as well as event propagation, in accordance with example embodiments.

FIG. 13F depicts a full event table, in accordance with example embodiments.

DETAILED DESCRIPTION

Figure 1:
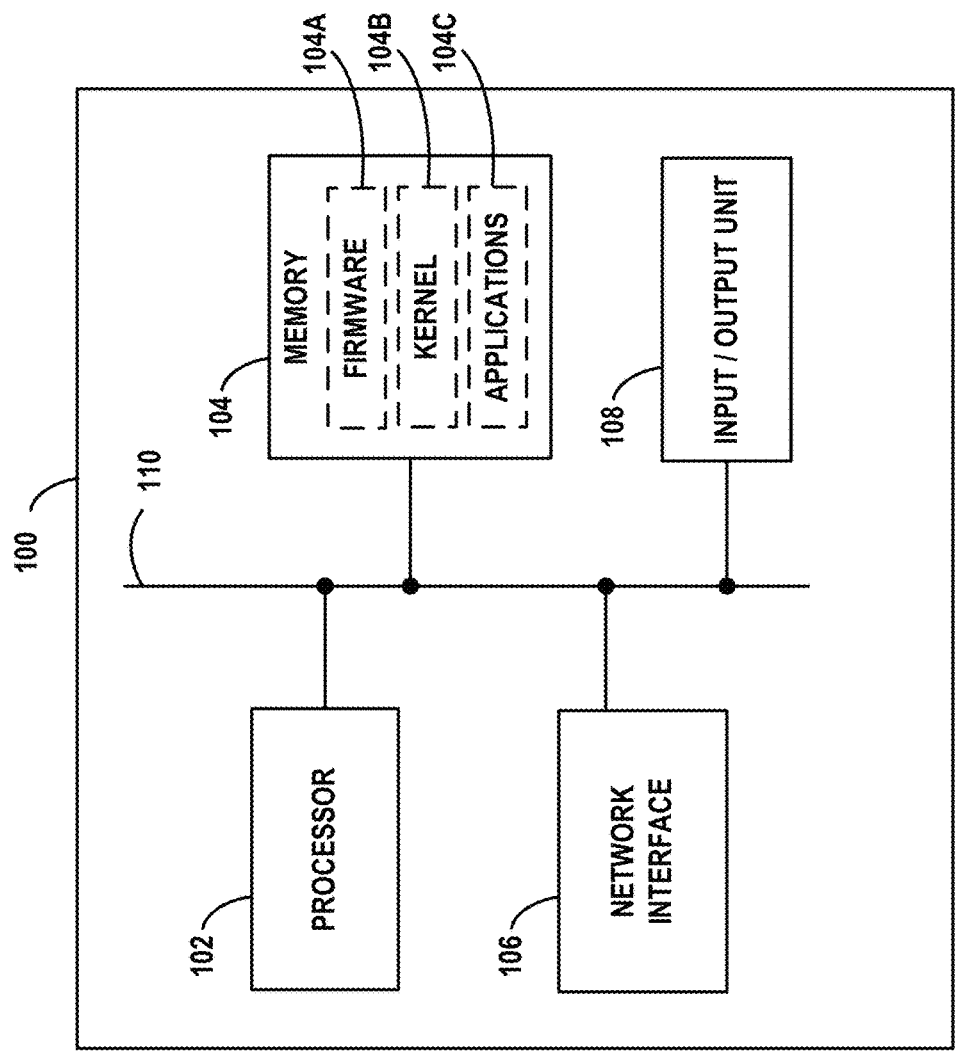
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling, and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
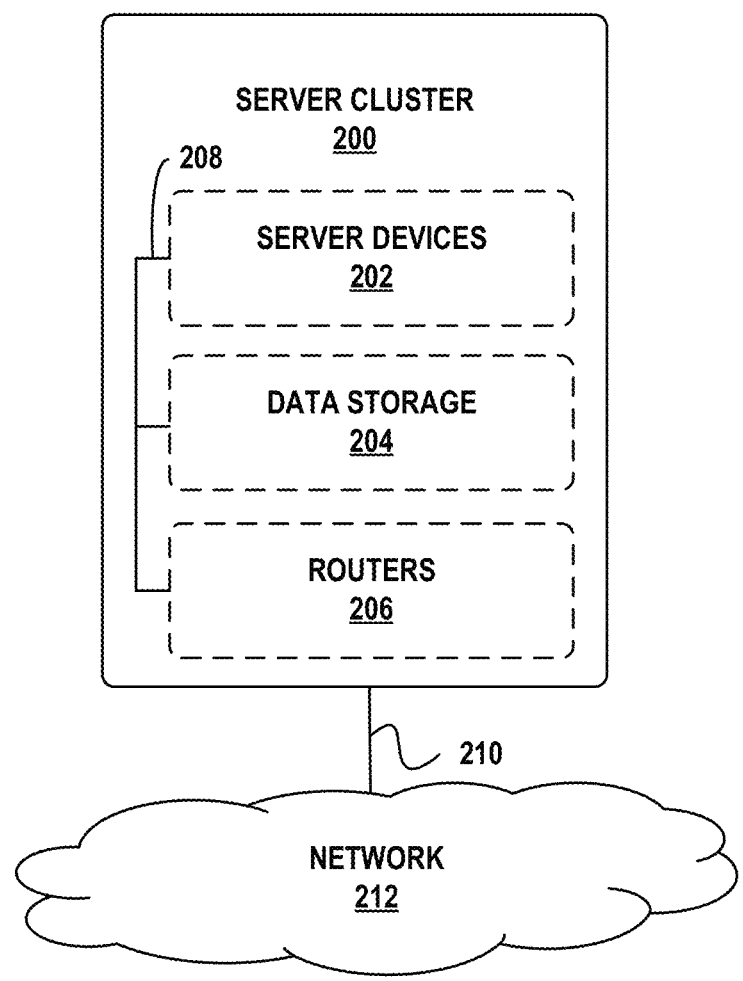
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
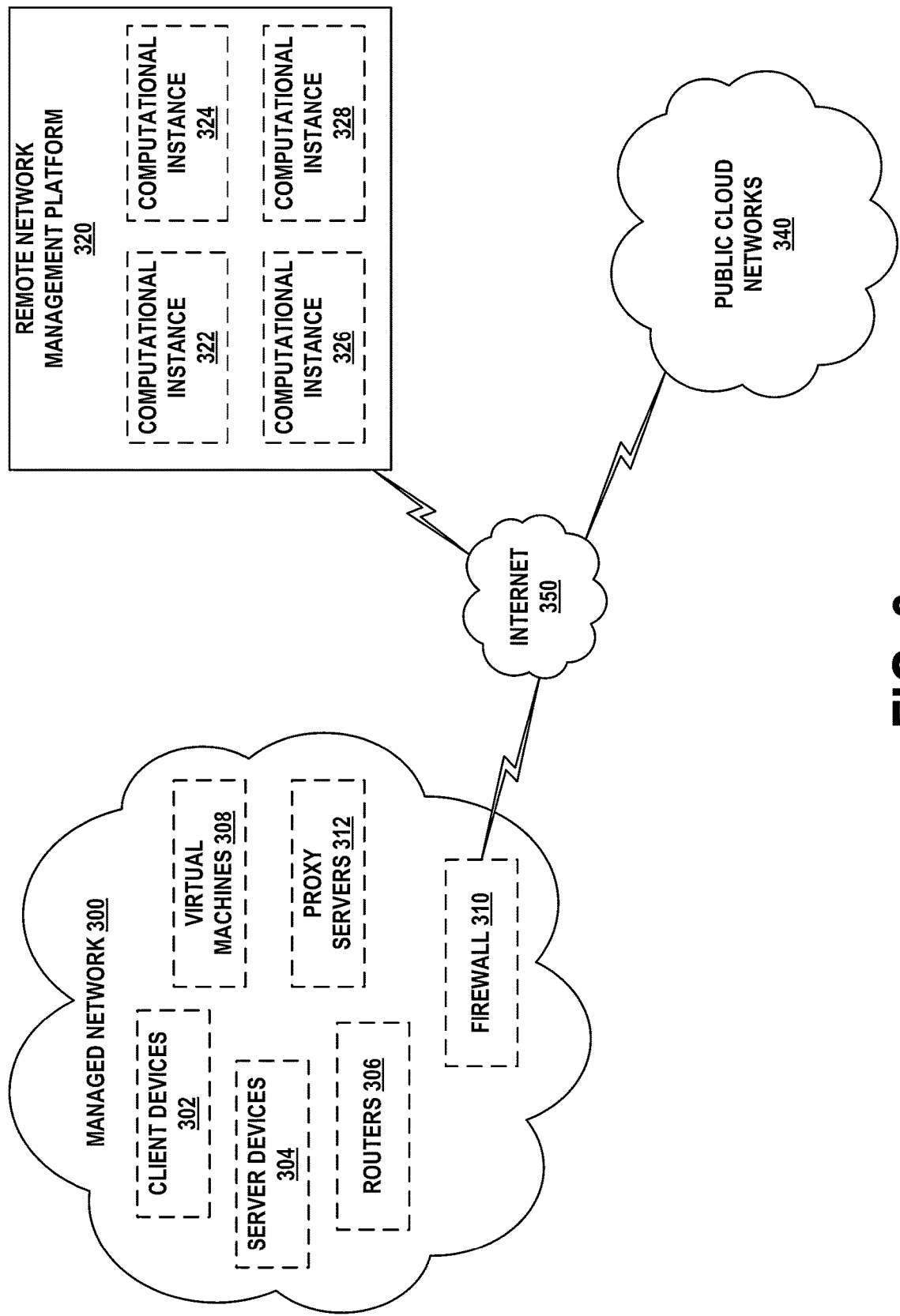
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
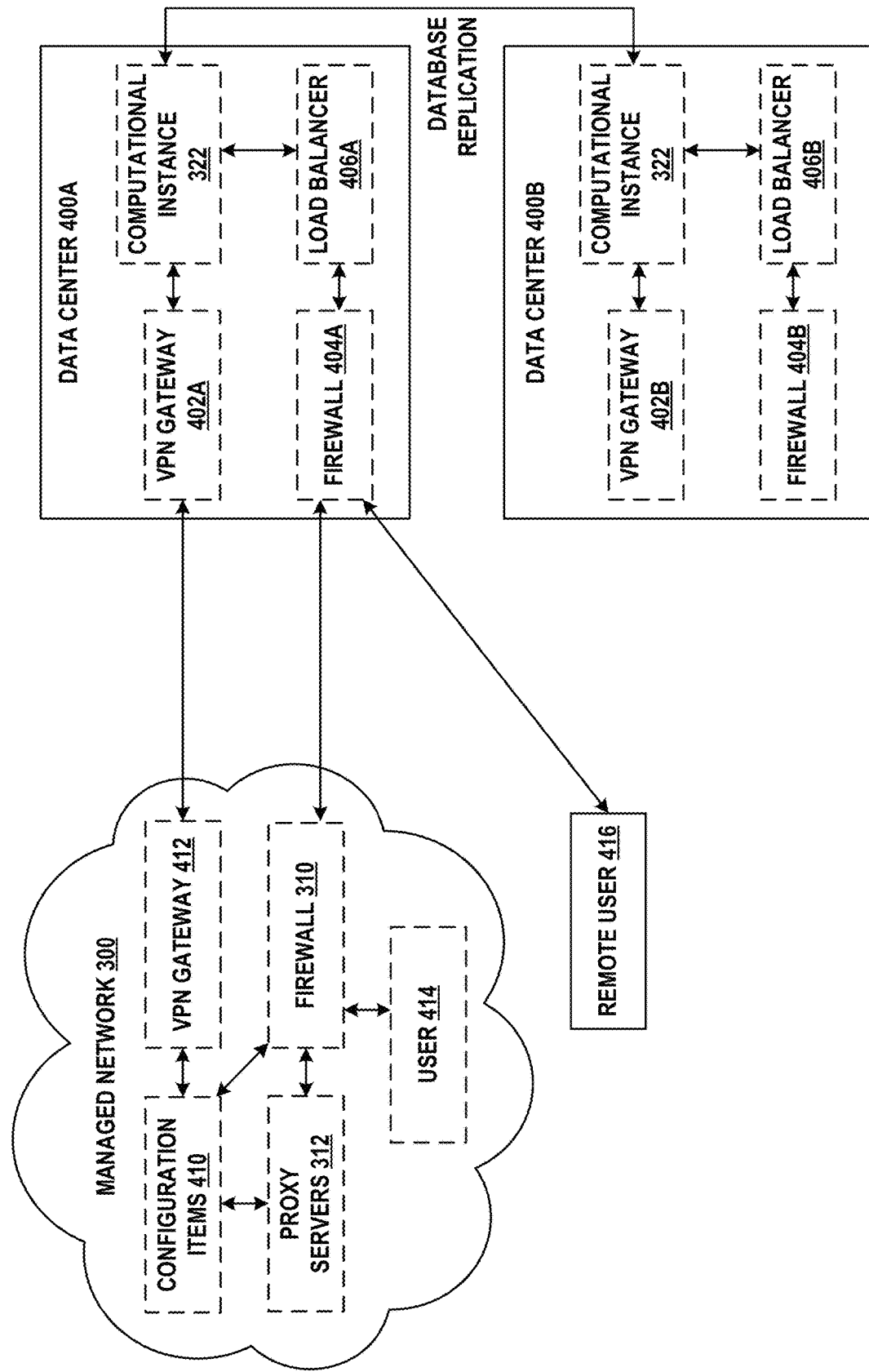
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
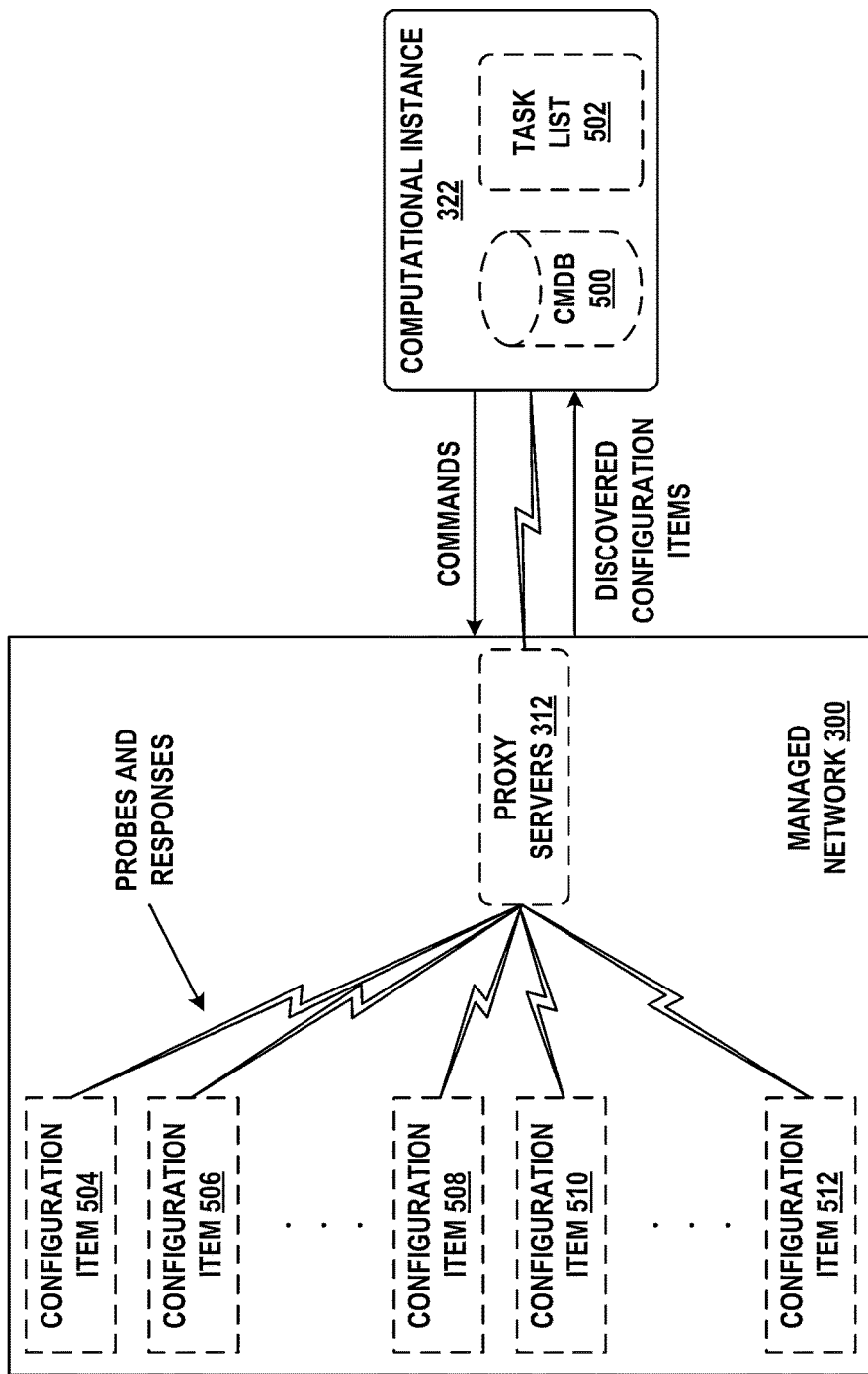
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
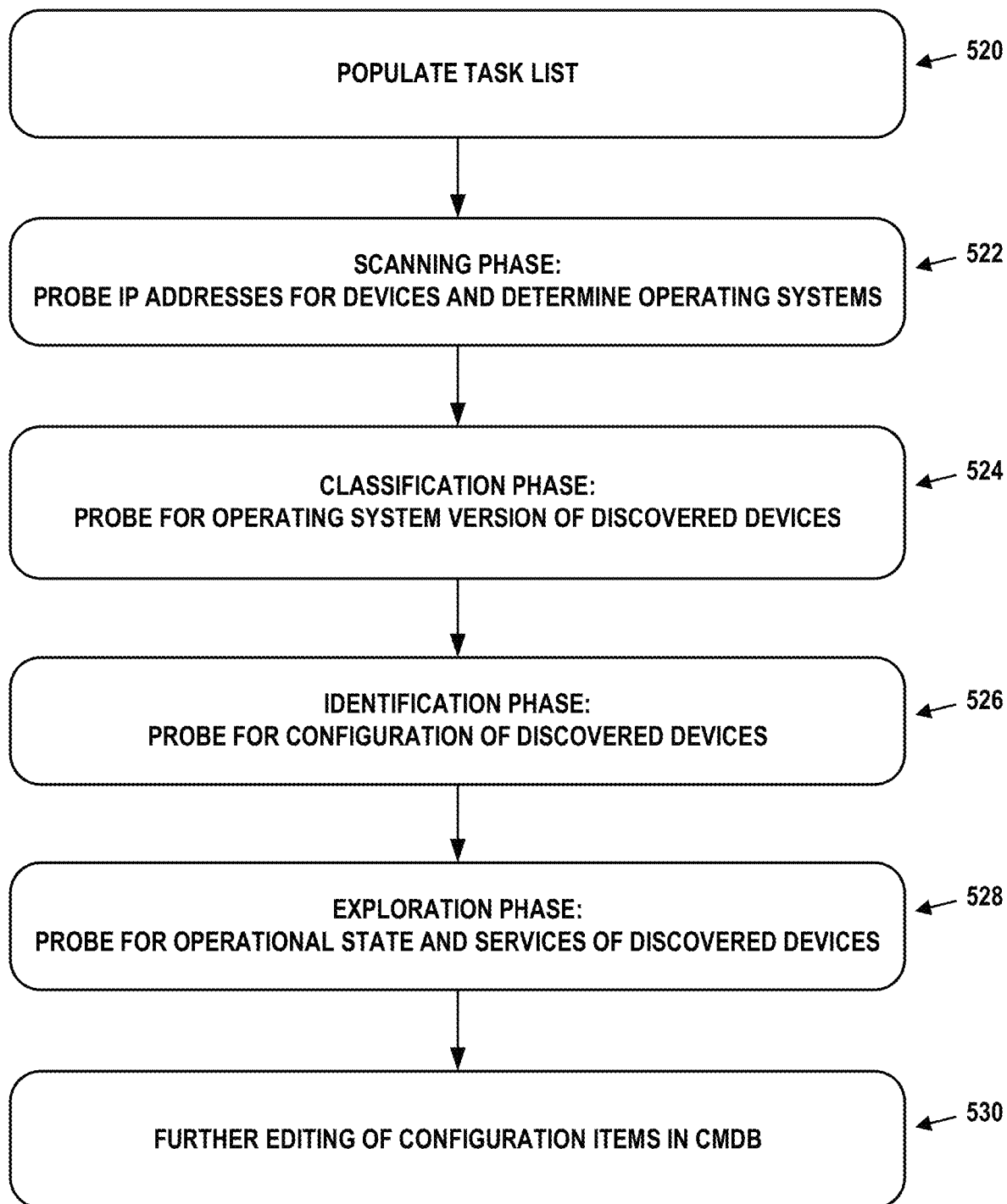
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Processes and Database Representations

The infrastructure of remote network management platform 320 may be used to facilitate processes in the form of workflows. Each process may be represented, for example, by a directed graph that has one or more starting and one or more ending nodes. As a work item flows through a process, the work item may change states based on its transitions between nodes of the graph (i.e., the nodes may represent the possible states of the work item).

Figure 6:
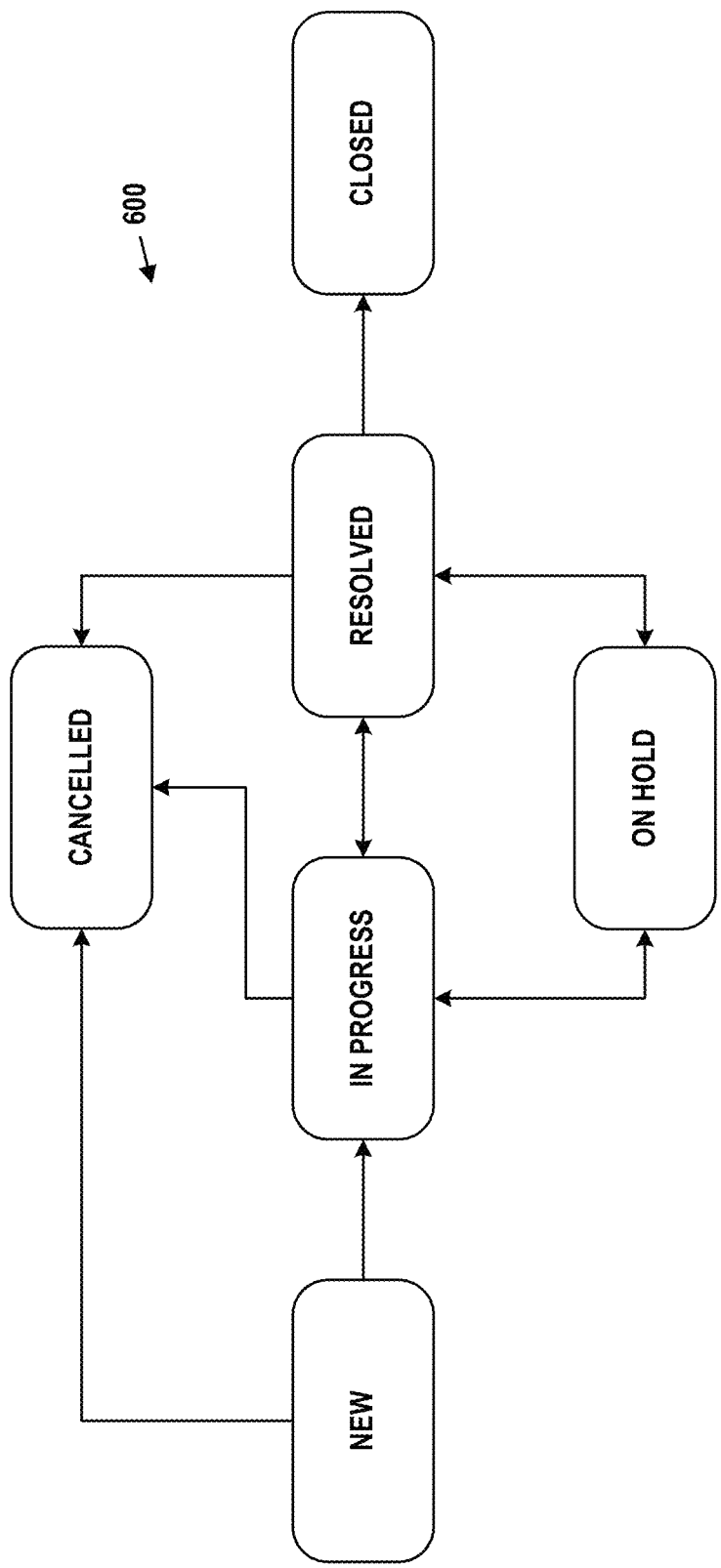
FIG. 6 is a graph depicting a process, in accordance with example embodiments.

FIG. 6 depicts an example workflow 600, in which the boxes (nodes) represent discrete states and the arrows between these states represent transitions. This workflow represents that of an IT incident. Such an incident may be created by a technology user who has encountered a problem (e.g., an application not working properly on their laptop, a network service that is not reachable) or automatically generated when an outage is detected. Each incident may progress through this workflow from the new state to either the cancelled state or the closed state. The incident may be assigned to an agent who is tasked with addressing the incident.

The states can be defined as follows. In the new state, the incident has been created but not yet investigated. In the in progress state, the incident has been assigned to an agent, and is being investigated or is scheduled for investigation. In the on hold state, the responsibility for the incident shifts temporarily from the assigned to another entity (e.g., the user or another agent) to provide further information, evidence, or a resolution. In the resolved state, the incident has been addressed by the agent. In the closed state, the incident has been confirmed to be satisfactorily resolved. In the cancelled state, the incident was triaged but found to be a duplicate incident, an unnecessary incident, or not representing an actual problem.

Workflow 600 is just one possible incident management workflow. Other such workflows involving more or few states and/or transitions may be possible. Workflow 600 also serves to represent more complicated workflows that go beyond just incident management.

Data related to each work item that is processed by a workflow may be logged, saved, or otherwise stored by the computational instance hosting the workflow. For example, data related to the states and transitions used by each work item, how much time each work item stays in each state, the user or users associated with each work item, and so on may be written to one or more logs. These logs may exist as files in a filesystem, entries in a database, or in some other form.

Such logs can later be mined for information regarding how the workflow is carried out in practice. This data mining can be used to identify bottlenecks and other inefficiencies in a workflow that are areas in which improvements to the workflow could possibly be made. For example, scripts on the computational instance could be automatically executed on demand or periodically to process the logs and output a representation of operational aspects of the workflow and/or one or more of its inefficiencies.

Figure 7:
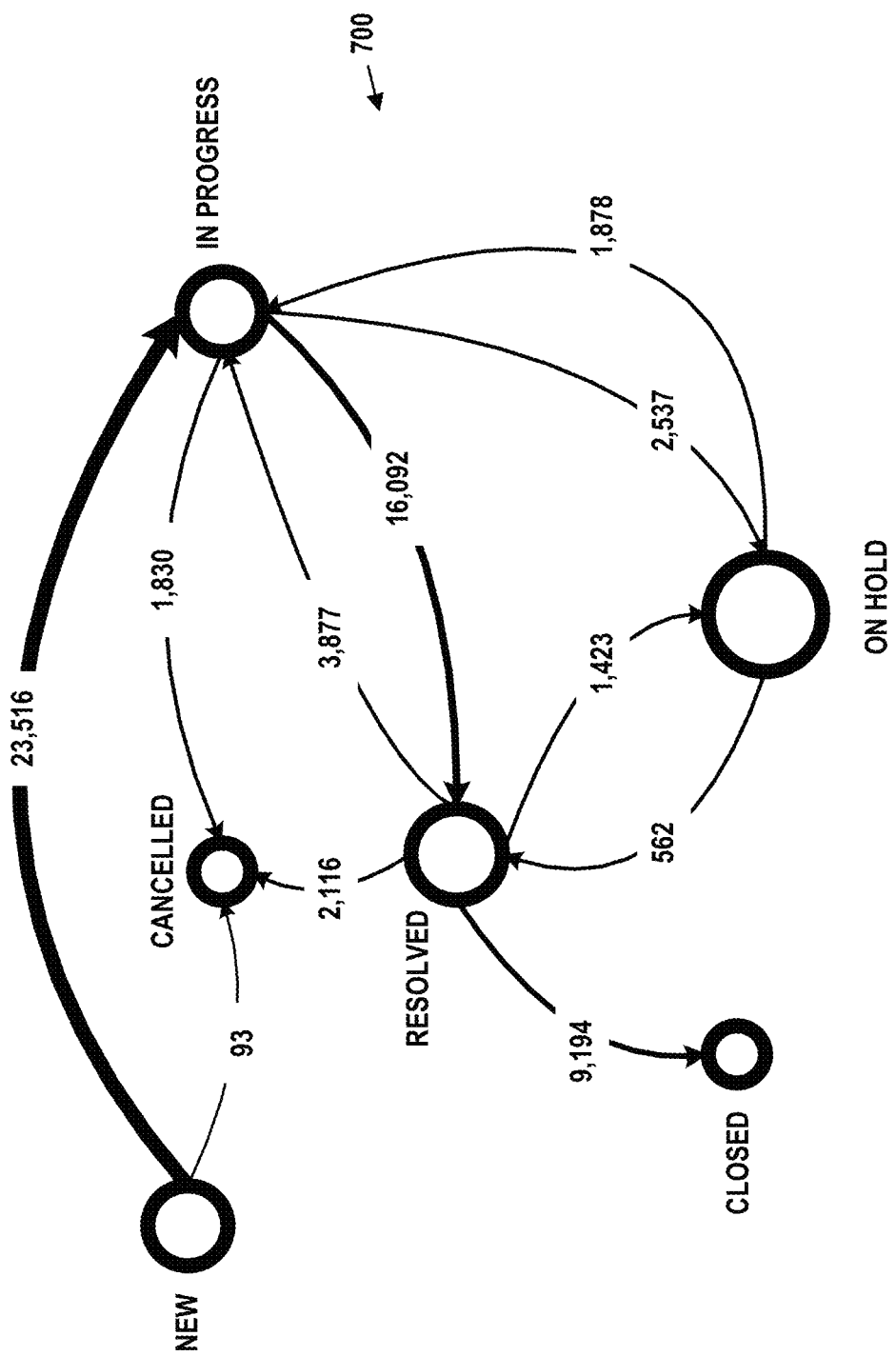
FIG. 7 is a state-occupancy diagram, in accordance with example embodiments.

To that point, FIG. 7 depicts state-occupancy diagram 700 for example executions of workflow 600. A state-occupancy analysis of a workflow may be carried out by the computational instance in response to a request from a user, such as a process analyst. The computational instance may parse the logs for the workflow, select a plurality of entries, and determine a historical distribution of work items among states of the workflow. The distribution may also account for transitions between states, thereby enabling transition rates between states to be derived.

The computational instance may generate a graphical representation of this distribution, such as that of state-occupancy diagram 700, and then transmit the generated graphical representation to a computing device of the requesting user. With this visual information, the user may troubleshoot the incident management workflow, and/or explore possible improvements to the workflow, for example.

In state-occupancy diagram 700, each state is represented graphically as a circle corresponding to a node. The size of each node may correspond to the occupancy of the associated state (e.g., the number of work items in each state). Transitions between states are shown as directed arrows, where the thickness of the each arrow's line corresponds to the number of transitions. The number of transitions is also indicated for each arrow. In state-occupancy diagram 700, the on hold state appears to have the largest occupancy, and the largest number of transitions is from the new state to the in progress state.

The occupancy of states and numbers of particular state transitions may be determined by a statistical analysis involving time-averaging over states and over specified time windows. Transition rates may also be derived from the numbers of transitions and the specified time windows.

A process analyst or other entity may inspect the data in the logs representing state occupancy, or the visual representation of state-occupancy diagram 700 to determine workflow inefficiencies. Example inefficiencies may include a large number of work items in a particular state (e.g., the on hold state of state-occupancy diagram 700 being heavily occupied), transitions representing a longer path taken through state-occupancy diagram 700 for a large number of work items, or work items "ping-ponging" in a cycle of two or more states. In some cases, the user interface presented may allow drilling down into the raw data from the logs and/or determining other factors associated with a workflow (e.g., the agents assigned to the largest number of incidents in the on hold state).

From the logs and/or state-occupancy diagram 700, process improvement recommendations can be made. Such recommendations may include suggestions of workflow states or transitions that can be automated, workflow states or transitions that can be removed, agents who could benefit from training, new software tools that could be employed to improve the workflow, and so on.

As noted above, modern organizations typically contend with complex, multi-process environments. For instance, an incident management workflow may be integrated in some fashion with change request, problem, and/or task workflows. As an example, a problem may identify an underlying root cause to one or more incidents. Change requests or tasks may be assigned to individuals whose job it is to address problems and/or incidents. Each of these workflows may have different processes, and therefore different states and different state-occupancy diagrams. These processes may be linked to one another in various ways.

Further, each process may be represented by its own database of work items and/or events. The work items may be representations of an execution of the process, and events may be log data relating to the progress of work items through the process (e.g., times of state transitions, input and output values when in states or upon transitions, etc.).

Figure 8:
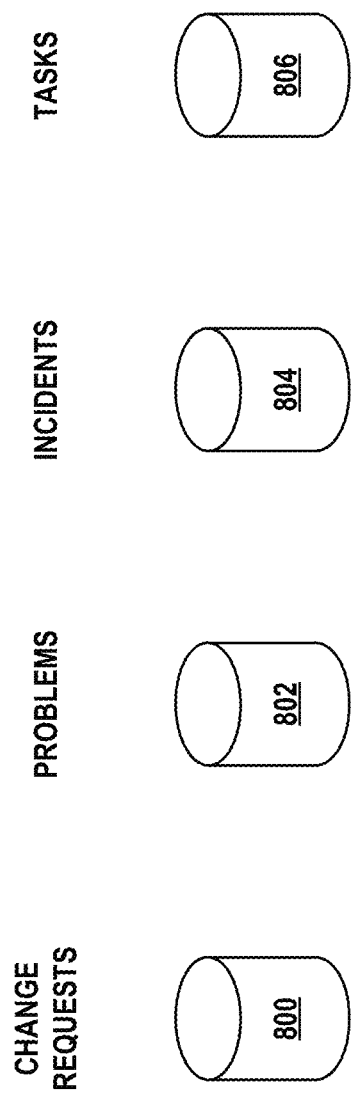
FIG. 8 depicts a multi-process environment, in accordance with example embodiments.

FIG. 8 depicts such an arrangement. Change request work items and/or events are stored in database 800, problem work items and/or events are stored in database 802, incident work items and/or events are stored in database 804, and task work items and/or events are stored in database 806. Databases 800, 802, 804, and 806 may be individual databases as shown, or their own tables within one or more common databases.

Analyzing processes individually can be informative and can lead to process improvement. However, as noted above, processes are often linked with or dependent on other processes in some fashion. Thus, the individual approach to process analysis is limited. For instance, if a number of incidents were ultimately caused by a common problem, those incidents may all get "stuck" in an in progress state until the underlying problem is resolved. But analysis of just the incident process in isolation may not be able to provide this dependency. As a consequence, a process analyst might spend time investigating each incident instead of being able to quickly determine that the delay addressing these incidents is due to a single unresolved problem. Thus, it is desirable to have process-analysis tools that consider multiple processes and the dependencies therebetween.

VI. Labeled Property Graphs

LPGs have been proposed as a way to model multi-dimensional processes. In practice, however, LPGs take significant computing resources to generate and store. This limits their use to very small databases. This section briefly introduces LPGs for purposes of context.

An LPG is a data structure where K is a set of keys, V is a set of values and L is a set of labels, where $L \cap V = \emptyset$. An LPG G=(N; R; L; prop) includes nodes N (as vertices) and relationships R (as edges) where each relationship $r \in R$ defines a directed edge $\vec{r} = (n_1, n_2) \in N \times N$ between two nodes. The labeling function $L: N \cup R \rightarrow 2^L$ assigns to each node and each relationship a non-empty set of labels designating their type. For nodes, this might include entity (En) and/or event (Ev). For relationships, this might include directly follows (DF), correlation, and/or child-to-parent (REL). Function prop: $(N \cup R) \times K \rightarrow V$ assigns each node and/or relationship an arbitrary number of key-value pairs, called properties.

Figure 9:
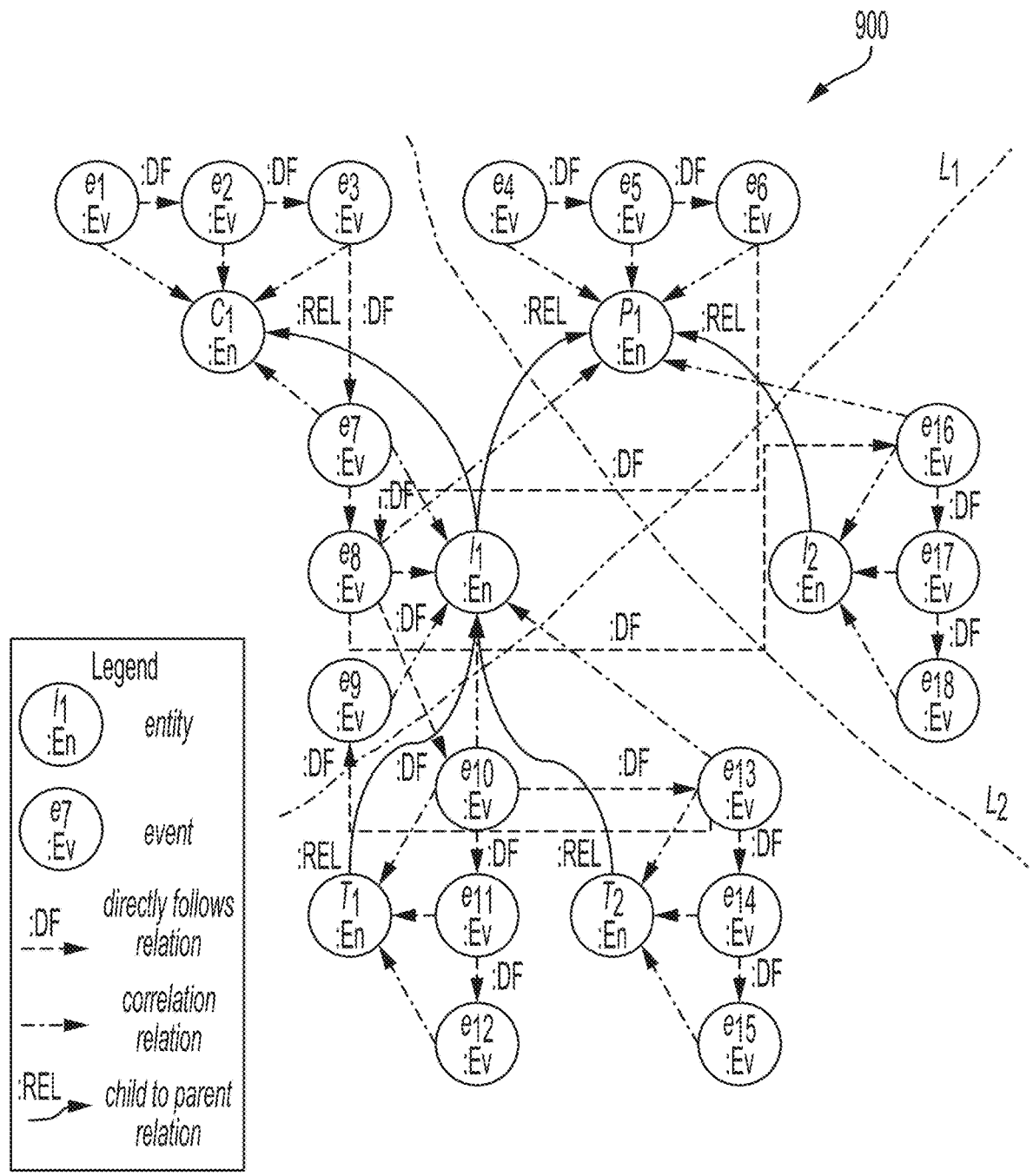
FIG. 9 depicts an LPG, in accordance with example embodiments.

An LPG can be used as a single universal source of information for queries related to execution of process instances of the process presented therein. An example LPG 900 is shown in FIG. 9. LPG 900 represents event data of process instances $C_1$ (process C), $P_1$ (process P), $I_1$ and $I_2$ (process I), and $T_1$ and $T_2$ (process T). Letters C, P, I, and T stand for the change request, problem, incident, and task processes respectively.

Child-to-parent relationships in LPG 900 are represented by an arrow from the child entity to the parent entity labeled with the term REL. For example, tasks $T_1$ and $T_2$ are children of incident $I_1$, i.e., these tasks are created for handling this incident. Then, incidents $I_1$ and $I_2$ are children of problem $P_1$, i.e., they are attached to the same problem that is their common underlying cause. Finally, incident $I_1$ is also a child of change request $C_1$. This incident has two parents because it was initially attached to $C_1$ (the attachment represented by event $e_7$), and then was attached to problem $P_1$ (the attachment represented by event $e_8$). The other incident $I_2$ is attached only to problem $P_1$ (the attachment represented by event $e_{16}$).

Sequences of events are represented by event nodes connected by arrows from preceding to subsequent events labeled with the term DF. For example, events $e_4$, $e_5$, and $e_6$ form an ordered sequence which continues to event $e_8$ and so on. Further, correlations between events and process instances are shown with dashed arrows from the events to the correlated process instance. Thus, events $e_4$, $e_5$, and $e_6$ are correlated with problem $P_1$.

Attempts to reduce the computing resource requirements of LPGs have involved divide-and-conquer strategies that split a large LPG in pieces (sub-graphs), and analyze these pieces individually. However, it is difficult to do so while preserving the information required for further process analysis. In other words, an LPG cannot be arbitrarily cut in pieces without at least some of the pieces losing context.

To illustrate the complexity of splitting, assume that LPG 900 is divided into two sub-graphs for the analysis of incident process instances and their interactions with the other process instances under low-memory conditions. If LPG 900 is divided along line L1, children $T_1$ and $T_2$ are detached from their parent incident $I_1$, and child $I_2$ is detached from its parent problem $P_1$. If LPG 900 is divided along line L2, incident $I_1$ is detached from its parent problem $P_1$. Both options eliminate a significant amount of information in the context "around" these incidents, thereby impacting quality of any consequent analysis.

VII. Process Instance Centric LPGs

The embodiments herein introduce the concept and structure of a process instance-centric LPG (PICLPG), which is a sub-graph of an LPG that preserves the information about one process instance of interest and its context (i.e., information about directly related instances of the other processes). Process analysis can be conducted on one or more PICLPGs rather than an entire LPG, thereby reducing the computing resources needed.

For example, the LPG shown in FIG. 9 can be used for the analysis of process instances of processes C, P, I, T, including their interactions. However, there is usually no strict need to analyze more than one process in a single analysis session. Instead, each process of interest can be analyzed one by one, using suitable LPGs that describe the instances of the chosen process of interest in context of instances of the other processes.

For example, consider the analysis of process I. For the analysis of incident $I_1$, the analyst needs the information about the events of $I_1$, and the information about events of its parents ($C_1$ and $P_1$) and children ($T_1$ and $T_2$). However, it is unlikely that another incident $I_2$, or the instances of the other processes that are parents/children of $I_2$ but not parents/children of $I_1$ affected the performance of $I_1$, so the analyst does not need to consider them for the analysis of $I_1$. In turn, the performance of incident $I_2$ can be affected by $P_1$ but not by $C_1$, $I_1$, $T_1$, or $T_2$.

Figure 10:
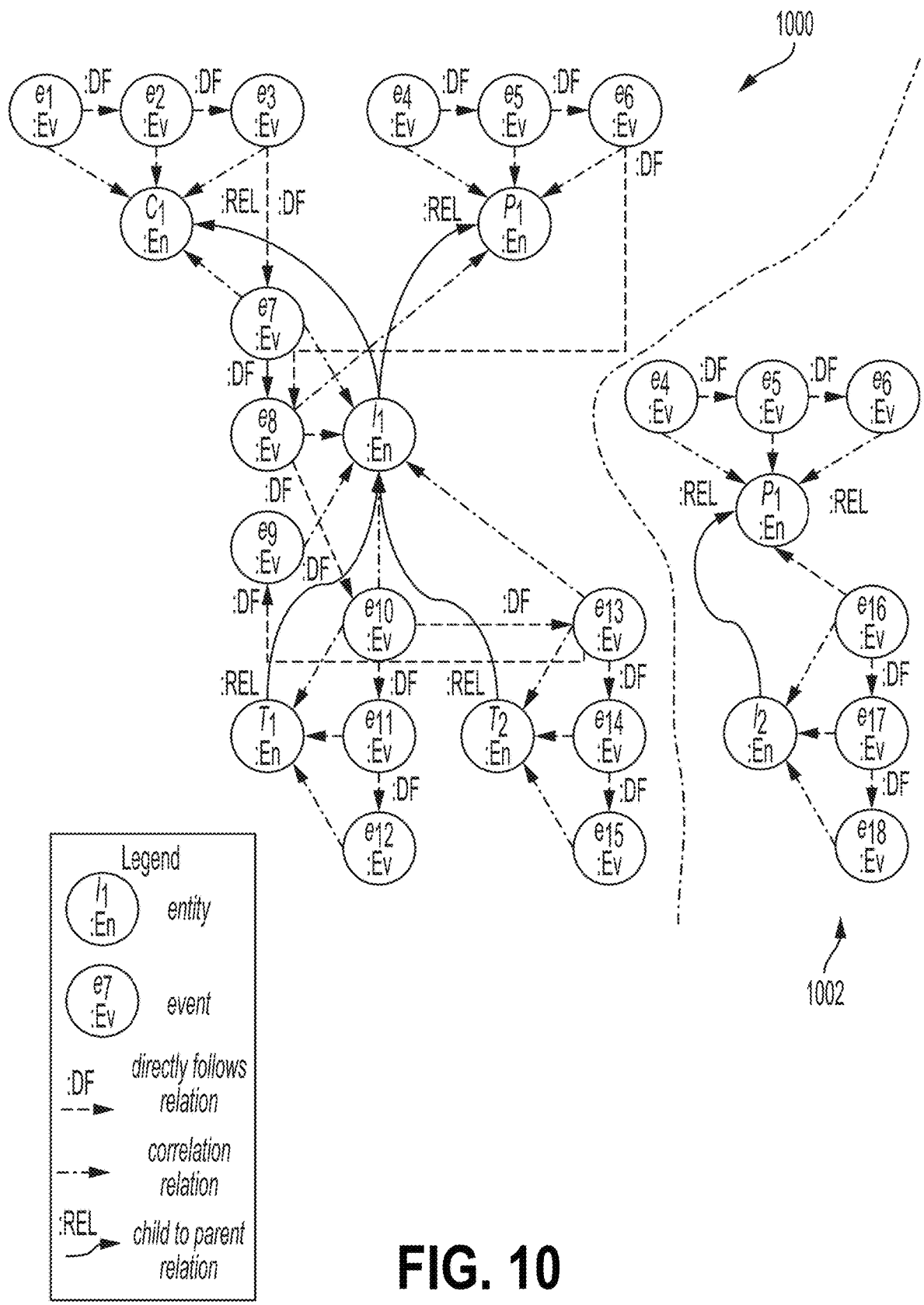
FIG. 10 depicts dividing an LPG into two PICLPGs, in accordance with example embodiments.

Thus, the nodes of incident $I_1$ together with the nodes of $C_1$, $P_1$, $T_1$, or $T_2$ form a PICLPG around $I_1$, and the nodes of $I_2$ together with the nodes of $P_1$ form a PICLPG "around" $I_2$. These PICLPGs are shown in FIG. 10, the former being PICLPG 1000 and the latter being PICLPG 1002. Note that the nodes of problem $P_1$ are presented in both graphs.

A. Naively Constructing a PICLPG

A PICLPG for a process instance $U_i$ of a process U can be extracted from an LPG using the following steps. First, identify the set S consisting of $U_i$ and all process instances that are ancestors or descendants of $U_i$. Second, identify the set E of events that are correlated only to the entities in set S. Third, construct a PICLPG by keeping only nodes in the union of S and E, and edges between these nodes.

Figure 11:
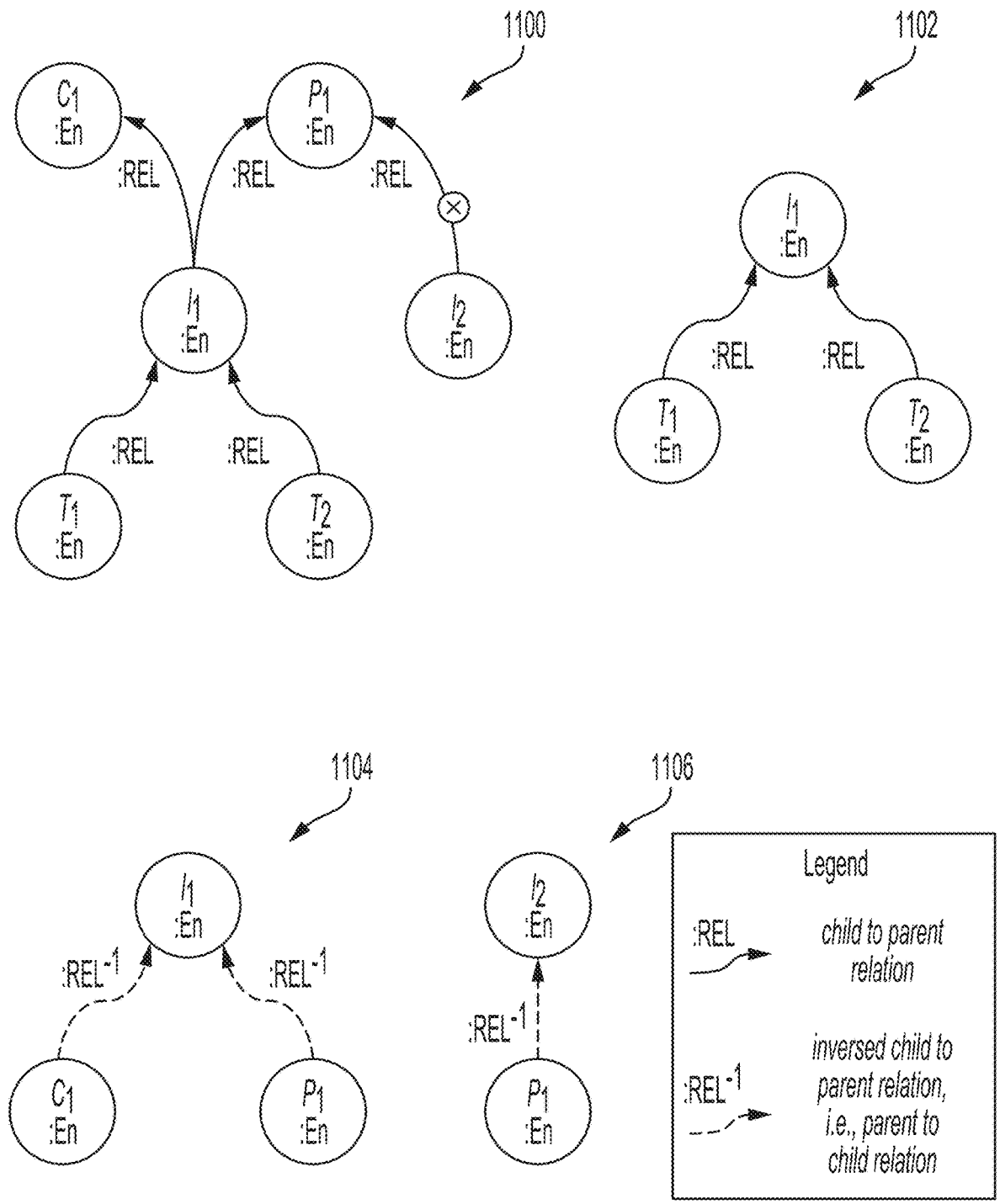
FIG. 11 depicts relationships between entity nodes of an LPG, in accordance with example embodiments.

Turning to FIG. 11 to demonstrate this approach, graph 1100 shows only the entity nodes of the LPG. Graph 1102 shows, for incident $I_1$, descendants $T_1$ and $T_2$. Graph 1104 shows, for incident $I_1$, ancestors $C_1$ and $P_1$. These ancestors and descendants form a set $S_1 = \{I_1, C_1, P_1, T_1, T_2\}$. Note that incident $I_2$ is not in $S_1$ because, as shown in graph 1106, $I_2$ only has the ancestor $P_1$, and no descendants. Thus, the combined ancestors and descendants of $I_2$ form a set $S_2 = \{I_2, P_1\}$. Then, events $e_1$-$e_{15}$ are correlated with entities in $S_1$, and events $e_4$-$e_6$ and $e_{16}$-$e_{18}$ are correlated with entities in $S_2$. It can be visually confirmed that this approach results in the PICLPGs of FIG. 10.

Although this technique for constructing PICLPGs is successful, its use is infeasible as it requires initially constructing a full LPG. In next subsections, it will be demonstrated that PICLPGs can be constructed directly from information in various process databases (e.g., databases 800, 802, 804, and 806).

B. Obtaining Complete Event Tables

Figure 12:
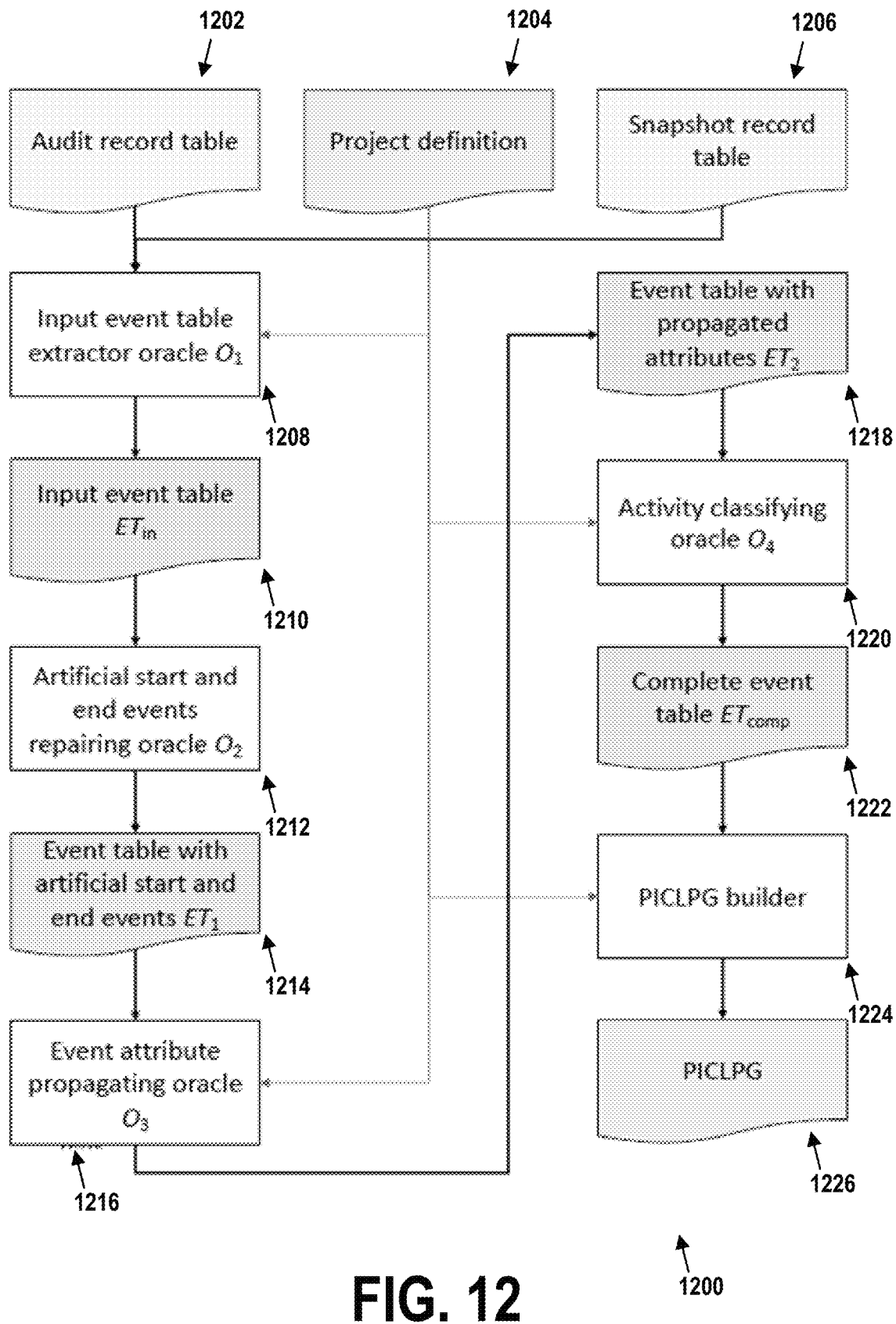
FIG. 12 depicts an approach for constructing PICLPGs from event tables, in accordance with example embodiments.

FIG. 12 depicts pipeline 1200 for constructing complete event tables from databases. This pipeline assumes that event data about process execution are available as a two-part dataset: (i) the latest snapshot of the process instance states, and (ii) their history. First, this dataset is transformed into an initial input event table. Then, a chain of oracles gradually transforms this initial input event table to a complete event table that contains enough information to build a PICLPG.

Regarding the oracles defined herein, this term refers to various types of algorithms that could be used to transform data (e.g., data within one or more event tables) from one form to another. A variety of such algorithms would be known to those skilled in the art or such a skilled individual would be able to derive such an algorithm without undue effort. These algorithms are not emphasized herein and left as oracles because they are not the main focus of the embodiments.

Notably, input event table extractor oracle $O_1$ 1208 takes audit record table 1202, project definition 1204, and snapshot record table 1206 as input, and produces input event table $ET_{in}$ 1210.

Note that pipeline 1200 shows one instance of each event table and PICLPG as input/output of each block for simplicity. In reality, each step takes and generates multiple elements, one per each instance of the process of interest.

1. Input

Before generating PICLPGs from a database, some additional information is needed, for example, identification of the process of interest as well as other processes that should be included in the PICLPGs. This information is given as a project definition, which can be specified as follows.

A project definition is a tuple PD=($pn_m$, PN, AN, relation, actClassifier), where $pn_m$ is a process of interest, PN is the finite set of processes names whose instances are to be included into resulting PICLPGs, and AN is the final non-empty set of the names of attributes of interest, i.e., whose historic data are assumed to be presented in the given data. The partial function relation: PN×AN↛PN maps a process in PN and an attribute name in AN to a process in PN, and partial function actClassifier: ε↛Act* maps events in ε to a (possibly empty) sequence of activity labels Act*. Here, ε represents the universe of all events, and Act represents a set of activity labels. Thus, the sequence of activities Act* represents zero or more activity labels. Further, a partial function maps at least a subset of the elements in its input to output values.

The current state of any process instance id∈$\mathcal{J}$ is described by its attributes with names in AN. One or multiple snapshot records can be organized into a snapshot record table Particularly, a snapshot record table is a tuple (SR, $\#_{an}^{PI}$), where SR⊆$\mathcal{J}$ is a non-empty finite set of process instance identifiers (referred to here as snapshot record identifiers), and process instance attribute function $\#_{an}^{PI}$:SR×AN ↛ Val maps a snapshot record SR and attribute name an∈AN to the value assigned to this attribute of SR. Further, the function $\#_{an}^{PI}$ defines the following attribute values for each record id∈SR: (i) a process instance identifier $\#_{id}^{PI}(e) \in \mathcal{J}$, (ii) a process name $\#_{process}^{PI}(e) \in$ PN, (iii) a process instance creation time $\#_{createdOn}^{PI}(e) \in \mathcal{T}$, and (iv) the identifier of a resource that created the process instance $\#_{createdBy}^{PI}(e) \in \mathcal{R}$, where PN is the set of all process names, $\mathcal{J}$ is the set of all process instance identifiers, $\mathcal{T}$ is the set of all possible timestamps, and $\mathcal{R}$ is the set of all possible resources that could create or change a process instance (e.g., users, automated procedures, etc.).

A snapshot record table contains the current state of process instances, but it contains no information about their history, i.e., how process instance attributes changed over time. This information is available in so-called audit records that are organized in audit record tables as follows. An example of a snapshot record table is shown in FIG. 13A.

An audit record table is a tuple (AR, $\#_{an}^{AR}$), where AR is a non-empty finite set of audit record identifiers, and an audit record attribute function $\#_{an}^{AR}$:AR×AN ↛ Val maps an audit record ar∈AR and an attribute name an∈AN onto a value assigned to this attribute. The function $\#_{an}^{AR}$ returns ⊥ if no value was assigned to an. Further, the function $\#_{an}^{AR}$ defines the following attribute values for each record ar∈AR: (i) an audit record identifier $\#_{id}^{AR}(ar) \in$ AR, (ii) a transaction identifier $\#_{trans}^{AR}(ar) \in$ AT, (iii) an attribute name whose value change the record describes $\#_{name}^{AR}(ar) \in$ AN, (iv) an old attribute value whose change this record describes $\#_{old}^{AR}(ar) \in$ Val, (v) a new attribute value whose change this record describes $\#_{new}^{AR}(ar) \in$ Val, (vi) an audit record creation time $\#_{time}^{AR}(ar) \in \mathcal{T}$, (vii) a process instance identifier whose execution triggered creation of this audit record $\#_{piId}^{AR}(ar) \in \mathcal{J}$, (viii) a process name whose execution triggered creation of this audit record $\#_{process}^{AR}(ar) \in$ PN, and (ix) the identifier of a resource that triggered creation of this audit record $\#_{res}^{AR}(ar) \in \mathcal{R}$, where AT is a set of transactions and PN is a set of process names.

Multiple audit records with the same transition identifier describe the simultaneous change of multiple attribute values, i.e., the change of values that occurred in a single event. An example of an audit record table is shown in FIG. 13B.

2. Running Example

The following example will be used to illustrate PICLPG construction. This example uses the four processes defined above: C, P, I, and T, standing for the change request, problem, incident, and task processes respectively.

Let I be the process of interest. A process instance of I can have parent process instances of processes C and P, i.e., it can be attached to an instance of C and/or P. Also, a process instance of I can have zero, one or multiple children—instances of T "attached" to it. In this example, there is a single instance $C_1$ of C, single instance $P_1$ of P, and two instances $T_1$ and $T_2$ of T.

Snapshot record table 1300 contains, besides mandatory attributes, values of attribute state, GID (a reference to an assignment group that is working on the instance), as well as CID, PID, and IID—references to the C, P, and I processes to which an incident or task is attached (if any). Here, the CID attribute for incident instance $I_1$ is empty, the PID attribute for incident instance $I_1$ is that of problem instance $P_1$, and the IID attribute for task instances $T_1$ and $T_2$ is that of incident instance $I_1$.

Audit record table 1302 provides the history of value changes for attributes of these process instances. Audit record $a_2$ shows, for example, that value of the attribute "state" was changed from n to w at time 2 for process instance $C_1$ of C by user user1 within transition 2. Here, the attribute states n, w, and r may stand for "new", "working", and "resolved", respectively.

3. Generating Input Event Tables

Input event tables can be generated from one or more snapshot record tables and one or more audit record tables. Input event tables are based on an event table definition.

An event table is defined to be a tuple (E, $pn_m$, $\#_{an}^{PI}$, $\#_{an}$) where: (i) E is a non-empty finite set of events, (ii) $pn_m$ is the name of a process whose event(s) must be in E, (iii) a process instance attribute function (PIAF) $\#_{an}^{PI}$:E×aN ↛ Val that maps an event e∈E and an attribute name an∈AN onto the latest value assigned to this attribute during the execution of a process instance that generates event e, or it returns, ⊥ if no value was assigned to an, and (iv) an event attribute function $\#_{an}$:E×AN↛Val that maps an event e∈E and an attribute name an∈AN onto the event attribute's value, or it returns ⊥ if the value is undefined.

The PIAF $\#_{an}^{PI}$ defines the following attributes for each event e∈E: (i) a process instance identifier $\#_{id}^{PI}(e) \in \mathcal{J}$, (ii) a process name $\#_{process}^{PI}(e) \in$ PN, (iii) a process instance creation time $\#_{createdOn}^{PI}(e) \in \mathcal{T}$, and (iv) an identifier of a resource that created the process instance $\#_{createdBy}^{PI}(e) \in \mathcal{R}$. The event attribute function $\#_{an}$ defines: (i) a timestamp $\#_{time}(e) \in \mathcal{T}$, and (ii) an identifier $\#_{res}(e) \in \mathcal{R}$ of a resource that executed the activity that generated event e.

A trace of a process instance with the instance identifier id is a finite sequence of events $\sigma = \langle e_1, \ldots, e_n \rangle \in E^*$ such that: (i) each event appears only once in σ, (ii) all events in σ are generated by the same instance identifier id of a process with process name pn, and (iii) the event ordering respect the timestamps, i.e., for 1≤i<j≤n and $e_i$, $e_j$, $\#_{time}(e_i) \leq \#_{time}(e_j)$. Given an event table ET, σ(ET, pn, id) refers to a trace derived from ET for instance id of process pn.

While the databases preserve historic information in the form of snapshot record tables and audit record tables, the corresponding events (not audit records) are used to construct a PICLPG. For that, an input table event extractor oracle $O_1$ (block 1208 of FIG. 12), that transforms these data into an input event table, is assumed. The input event table contains the same information in the form of events and their attributes, available through an event attribute function.

Note that process instance attributes are available through the same PIAF $\#_{an}^{PI}$ that is defined in a given snapshot record table. A corresponding input event table contains: (i) exactly one event per each transaction of a given audit record table, and (ii) an additional initial event, describing the process instance creation, per each process instance.

This table definition is as follows. An input event table is an event table where, for each event $e \in E$, the corresponding derived trace $\sigma = \sigma(ET, \#_{process}^{PI}, \#_{id}^{PI}) = <e_1, \ldots, e_n>$ has an initial event $e_1$ with a timestamp equal to the corresponding process instance creation time, i.e., $\#_{time}(e_1) = \#_{createdOn}^{PI}(e_1)$. Additionally, the initial events have all process instance attributes in AN, defined at the time moment $\#_{time}(e_1)$, defined as this event attributes.

Figure 13C:
FIG. 13C depicts an input event table, in accordance with example embodiments.

In FIG. 13C, input event table 1304 is shown. This table is derived from snapshot record table 1300 and audit record table 1302. In this table, events e2, e9, e14, e20, and e25 are initial events. Further, event e5 describes two audit records a3 and a4 with transaction identifier 3. Each remaining event corresponds to a single audit record and a single transaction identifier. Note, these event attributes are defined only if an attribute was changed during the corresponding transaction, otherwise it is undefined (thus taking on a value of $\perp$).

4. Attribute Enhancement

In an input event table, for each event, the process instance state at the moment the event occurred is described by: (i) this event's attributes, and (ii) the attributes of all the previous events generated by this process instance, i.e., the process state information is scattered across the current and multiple previous events. This would require extra walks to query the process instance state for each event in the resulting PICLPG. To avoid these extra walks, artificial start and end events for each process instance trace are added to have unified start and end of each process instance. Further, the attribute values of previous events are propagated to attribute values of future events.

For the former, an input event table with artificial start and end events is defined as follows. Given a project definition PD, and an input event table ET'=(E', $pn_m$, $\#_{an}^{PI}$, $\#_{an}'$) an input event table with artificial start and end events is a tuple ET=(E, $pn_m$, $\#_{an}^{PI}$, $\#_{an}$) where E'$\subset$E and where for each event e in E and the corresponding derived trace $\sigma$, the following holds: (i) each trace contains at least two artificial events and one initial event—i.e., the number of events in the trace is at least 3, (ii) event $e_1$ is an artificial start event, (iii) event $e_n$ is an artificial end event, (iv) the event attribute function $\#_{an}$, restricted to the events in E', defines all event attributes of events in E' exactly as function $\#'_{an}$, (v) for artificial start event $e_1$, event attribute function $\#_{an}$ defines all the attributes of event $e_1$, and assigns an additional attribute artType, that indicates that this event is artificial, to value artStart, i.e., $\#_{artType}(e1)$=artStart, and (vi) for artificial end event $e_n$, event attribute function $\#_{an}$ defines all the attributes of event $e_{n-1}$, and assigns an additional attribute artType to value artEnd, i.e., $\#_{artType}(e_{n-1})$=artEnd. Thus, an artificial start and end event of each trace contains the attributes of the next and previous events respectively.

For this procedure, an artificial start and end event repairing oracle $O_2$ (block 1212 of FIG. 12), that generates the artificial events, is assumed. The result is the event table of block 1214.

An input event table 1306 with artificial start and end events is shown in FIG. 13D. This table is derived from the input event table 1304. In input event table 1306 events e1, e7, e8, e12, e13, e18, e19, e23, e24, and e28 are artificial.

Next, an event table with artificial start and end events is transformed into an event table with propagated event attributes. The propagated event attributes are defined (and distinguished from non-propagated ones) through a propagated event attribute function. This table definition is as follows: Given a project definition PD, and an input event table with artificial start and end events ET'=(E,$pn_m$, $\#_{an}^{PI}$, $\#_{an}$), an event table with propagated event attributes is an tuple ET=(E, $pn_m$, $\#_{an}^{PI}$, $\#_{an}$, $\#_{an}^{PRO}$), where $\#_{an}^{PRO}$ is a propagated event attribute function $\#_{an}^{PRO}$:E$\times$AN $\nrightarrow$ Val that maps each non-artificial non-initial event e$\in$E, and the value of attribute an$\in$AN to a value val $\in$ Val that was previously assigned to the corresponding process instance attribute if this attribute was not (re)assigned on execution of the activity generated this event e. In other words, for all events e$\in$E and trace $\sigma$ with at least n=4 events, $\forall i | 1 < i < n-1$, for $\forall$an$\in$AN|$\#_{an}(e_i) \neq \perp$, function $\#_{an}^{PRO}$ maps the value of attribute an of event $e_{i+1}$ to the value of event $e_i$ if $\#_{an}(e_{i+1})=\perp$.

For this procedure, an event propagating oracle $O_3$ (block 1216 of FIG. 12), that propagates the events, is assumed. The result is the event table of block 1218.

An input event table 1308 with propagated event attributes is shown in FIG. 13E. This table is derived from the input event table 1306 with artificial start and end events. In event input table 1308, propagated attribute values are shown with superscript PRO. Note that attributes are propagated to the artificial events as well.

5. Obtaining a Complete Event Table

The final step of the event table transformation is obtaining a complete event table that defines: (i) an activity label for each event, and (ii) may contain reconstructed missing events, i.e., events that are not in a given event table with propagated attributes. The missing events are a way to have more than one event per audit record transaction identifier (if this approach is needed for the analysis of the resulting PICLPG).

Each reconstructed missing event e has a special attribute relEv, where $\#_{relEv} \in E$ refers to the event in the event table with propagated attributes, generated within the same transaction. The definition of the resulting complete event table is as follows. Given a project definition PD, and an event table with propagated attributes ET'=(E', $pn_m$, $\#_{an}^{PI}$, $\#'_{an}$, $\#'^{PRO}_{an}$), a complete event table is a tuple ET=(E, $pn_m$, $\#_{an}^{PI}$, $\#_{an}$, $\#_{an}^{PRO}$) where E' $\subseteq$ E, and where: (i) an attribute function $\#_{an}$ defines a related event identifier $e_r \in$ E' for attribute name relEv for events not in E', defines an activity label for events in E, i.e., $\#_{act}(e)$=actClassifier(e), preserves the value mapping of $\#'_{an}$ for events in E', and preserves the value mapping of related events for events in E\E', and (ii) a propagated event attribute function $\#_{an}^{PRO}$ preserves the value mapping of $\#'^{PRO}_{an}$ for events in E', and preserves the value mapping of related events for events in E\E'.

For this procedure, an activity classifying oracle $O_4$ (block 1220 of FIG. 12), that classifies the activities, is assumed. The result is the event table of block 1222.

A complete event table 1310 is shown in FIG. 13F. This table is derived from the input event table 1308 with propagated attributes. As an example, in event input table 1310, event e4 was reconstructed to show assigning start state and group as two independent events. In this table, each event has activity label attribute act defined.

C. Constructing a PICLPG from a Complete Event Table

As we discussed previously, a goal is to transform multi-dimensional event data into a set of PICLPGs for its further analysis. For that, one chooses a process of interest first, and obtains a complete event table per instance (trace). This complete event table ET is the input for constructing a PICLPG, together with a given project definition PD. In this section, the approach for building a PICLPG from this input is described using the same running example as in the previous section. In the context of FIG. 12, a PICLPG builder 1224 creates a PICLPG from complete event table 1222.

D. Entities, Events, and Their Relations

In terms of an LPG, a complete event table contains events generated by execution of entities, i.e., process instances. For example, input event table 1304 from FIG. 13C contains events of entities $P_1$, $C_1$, $I_1$, $T_1$, and $T_2$. In a PICLPG, events and entities are represented as nodes. One node for each entity is added to the PICLPG, as is one node for each event of given complete event table. Each node has type EN for entities or type EV for events. Further, entity nodes are annotated with entity identifiers ($P_1$, $C_1$, $I_1$, $T_1$, and $T_2$ in this example), while event nodes are annotated with event identifiers ($e_1$-$e_{28}$), and their attributes if needed.

Figure 14:
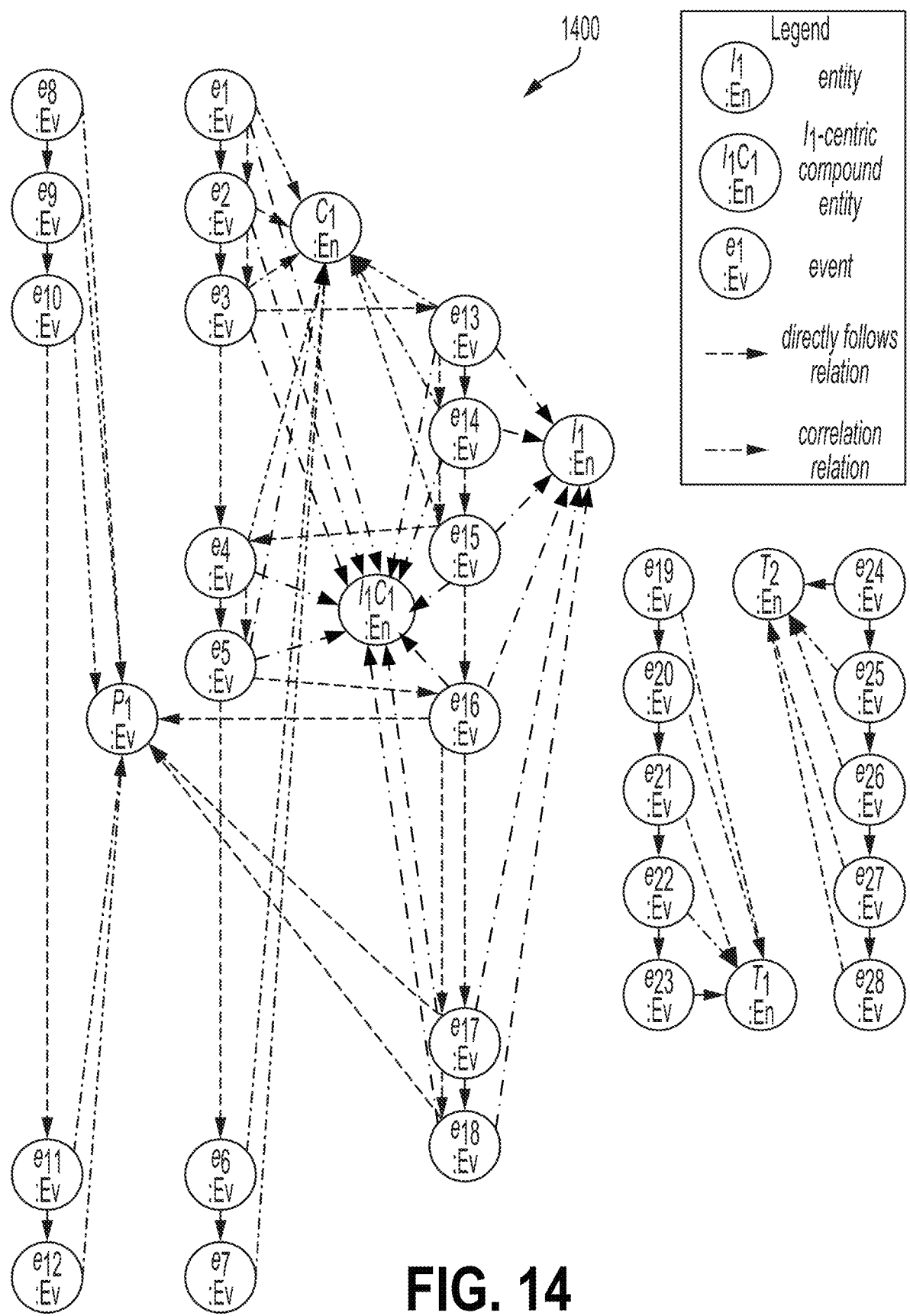
FIG. 14 is a PICLPG that can be constructed from the full event table, in accordance with example embodiments.

A PICLPG 1400 is constructed for complete event table 1310 is shown in FIG. 14, where the entity and events of the process instance of interest (here, $I_1$) are highlighted and are those of entity $I_1$ and events $e_{12}$-$e_{17}$. Attributes are omitted from this figure for simplicity. Further, correlation relations from each of $e_{19}$-$e_{28}$ to entity $I_1$ are not shown to reduce clutter.

After all nodes are added to the PICLPG, edges that show event-entity relations between events and entities are added. In PICLPGs, correlations between entities and events are represented if: (i) an event is generated by this entity, e.g., process instance $P_1$ is generated event $e_8$, or (ii) an event refers to this entity, e.g., event $e_{16}$ generated by $I_1$ refers to entity $P_1$ through its attribute PID. If an event is correlated to an entity, an edge with relation type CORR (shown as dashed arrows) is added.

If interactions of two (or more) process instances are to be analyzed, compound entities can be used. A compound entity helps to represent directly follows relations between events of different entities. For example, if performance of $I_1$ depends on the performance of $C_1$, a compound instance $I_1C_1$ can be introduced for its analysis.

Further, entity to entity relations can be added to a PICLPG. These are not shown in FIG. 14, however, they already have been discussed previously and shown in FIG. 11. More information on entity to entity relations can be found in Esser, S., Fahland, D., Multi-dimensional event data in graph databases, *Journal on Data Semantics*, pp. 1-33 (2021), which is hereby incorporated by referenced in its entirety herein.

E. Directly Follows Relationships

Possibly after all nodes, event-entity and entity-entity relations are added, edges showing directly follows relations are added between events. This is information useful for the further PICLPG-based process analysis. In general, all the events correlated to the same entity are strictly ordered by timestamp. However, there are multiple design choices for representing this relation in LPGs. For example, one possible design option allows avoiding extra walking through the graph, and possible ambiguity while coupling an edge with the entity it is derived from (see the third design option in J. Leander, Automated Translation of Event Data from Relational to Graph Databases, *Masters Thesis*, Department of Mathematics and Computer Science, Eindhoven University of Technology, May 2020, which is hereby incorporated by referenced in its entirety herein). However, it also leads to a quite complex and dense graph structure. In general, there exist other design options for representing directly follows relations. Thus, other possibilities exist.

As a result, directly follows edges are added in the following manner. Directly follows relations for single (non-compound) entities are considered if they are isolated, i.e., directly follows relations are derived for events that are generated by the entity process instance. For example, for instance $P_1$ the following edges are added for this relation: ($e_8$, $e_9$), ($e_9$, $e_{10}$), ($e_{10}$, $e_{11}$), ($e_{11}$, $e_{12}$), and edges going/coming to $e_{15}$-$e_{17}$ that refer to $P_1$ are not added despite their being also correlated to $P_1$.

For representing directly follows relations between events generated by different processes, compound nodes are used that are composed from: (i) the entity of interest (here, $I_1$), and (ii) another entity. For these entities, directly follows relations are represented for: (i) all events of the entity of interest, and (ii) correlated events of the other entity. For example, for a compound entity $I_1C_1$, all events of $I_1$ are considered ($e_{13}$-$e_{18}$), and the correlated events of $C_1$ ($e_1$-$e_5$) are considered. Note that events $e_6$ and $e_7$ are not included because they are not correlated to $I_1C_1$ since $I_1$ is "detached" from $C_1$ and "attached" to $P_1$ in event $e_{16}$, and the timestamps of events e6 and e7 are later than those of event $e_{16}$. For these events, directly follows relations are derived from the event timestamps, they are shown by arrows in FIG. 14.

The resulting PICLPG can be presented to a user (e.g., on a graphical user interface) so that the user can assess the underlying processes for inefficiencies. For example, the user may determine that the root cause of a number of incidents being stuck in an in progress state is that there is an unresolved problem blocking progress on these incidents. In this manner, the user can identify the problem and escalate the resolution of that problem to unblock the incidents. Numerous additional examples exist.

VIII. Example Operations

Figure 15:
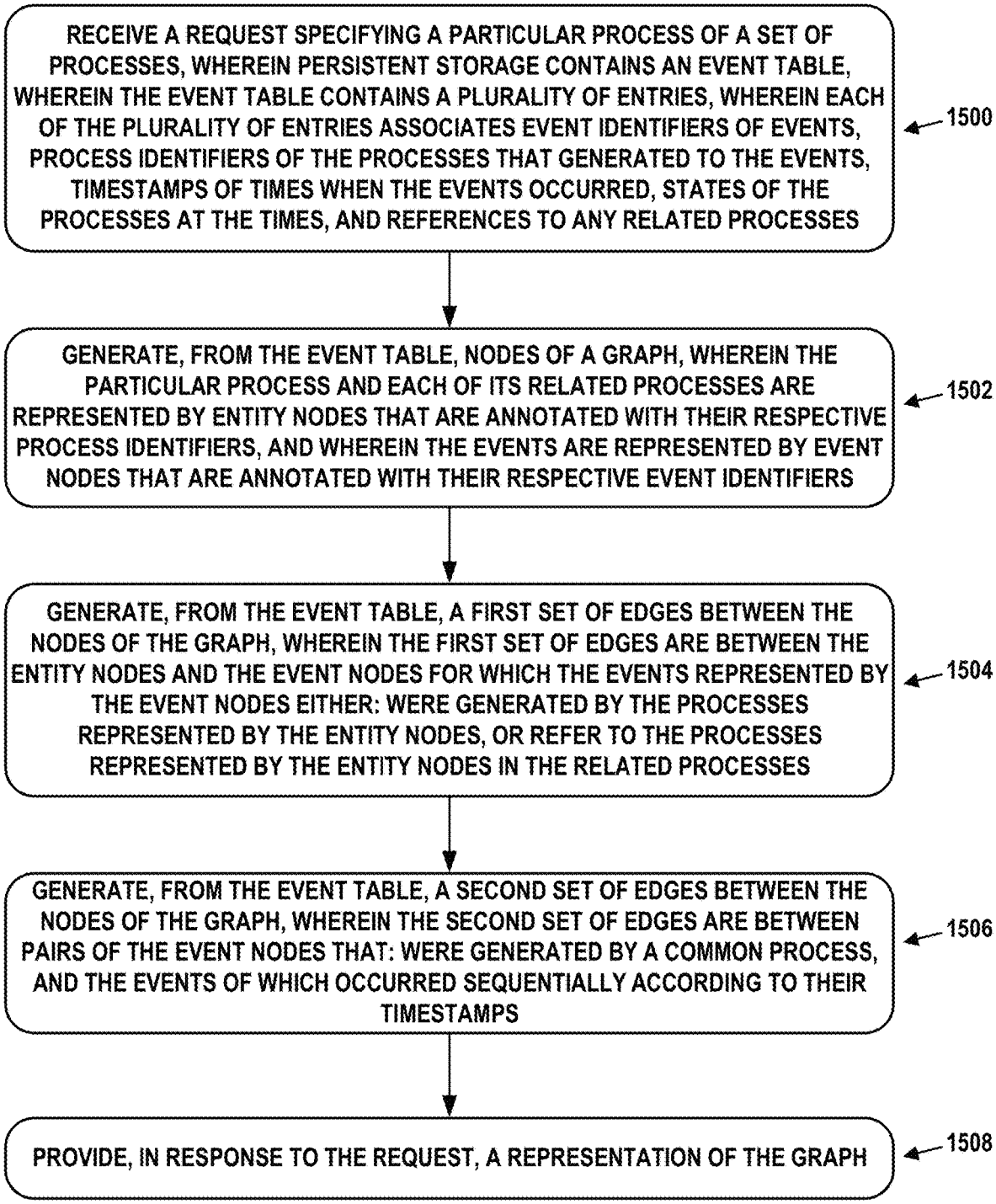
FIG. 15 is a flow chart, in accordance with example embodiments.

FIG. 15 is a flow chart illustrating an example embodiment. The process illustrated by FIG. 15 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 15 may be simplified by the removal of any one or more of the features shown therein. Further, these embodiments may be combined with features, aspects, and/or implementations of any of the previous figures or otherwise described herein.

Block 1500 may involve receiving a request specifying a particular process of a set of processes, wherein persistent storage contains an event table, wherein the event table contains a plurality of entries, wherein each of the plurality of entries associates event identifiers of events, process identifiers of the processes that generated to the events, timestamps of times when the events occurred, states of the processes at the times, and references to any related processes.

Block 1502 may involve generating, from the event table, nodes of a graph, wherein the particular process and each of its related processes are represented by entity nodes that are annotated with their respective process identifiers, and wherein the events are represented by event nodes that are annotated with their respective event identifiers.

Block 1504 may involve generating, from the event table, a first set of edges between the nodes of the graph, wherein the first set of edges are between the entity nodes and the event nodes for which the events represented by the event nodes either: were generated by the processes represented by the entity nodes, or refer to the processes represented by the entity nodes in the related processes.

Block 1506 may involve generating, from the event table, a second set of edges between the nodes of the graph, wherein the second set of edges are between pairs of the event nodes that: were generated by a common process, and the events of which occurred sequentially according to their timestamps.

Block 1508 may involve providing, in response to the request, a representation of the graph.

In some embodiments, the request also specifies a second particular process of the processes, wherein the particular process and the second particular process were related during at least some of the events. These embodiments may further involve: generating a compound entity node representing the particular process and the second particular process; identifying, from the event table, a subset of the events that were generated by the particular process or the second particular process while they were related; and generating, from the event table, a third set of edges between the nodes of the graph, wherein the third set of edges are between further pairs of the event nodes representing the subset of the events, in which the events occurred sequentially according to their timestamps.

Some embodiments may further involve generating, from the event table, a third set of edges between the nodes of the graph, wherein the third set of edges are between further pairs of the entity nodes for which their associated processes are related.

In some embodiments, the representation of the graph is received by a client device, wherein reception of the representation of the graph causes the client device to display, on a graphical user interface, the nodes and any edges therebetween as specified by the representation.

In some embodiments, the processes include one or more of incidents, problems, tasks, or change requests related to use of technology.

In some embodiments, the persistent storage also includes a snapshot record table and an audit record table, wherein the snapshot record table contains information relating to current states of the processes and the references to the related processes, wherein the audit record table contains information relating to state changes of the processes. These embodiments may further involve generating the event table based on the snapshot record table and the audit record table.

In some embodiments, generating the event table based on the snapshot record table and the audit record table comprises: generating an input event table that has a plurality of input entries, wherein each of the plurality of input entries associates subsets of the event identifiers, the process identifiers, the timestamps, the states, and the references in accordance with the snapshot record table and the audit record table; and assigning the input event table to be the event table.

Some embodiments may further involve: adding artificial start events to the events associated with each of the processes in the input event table, wherein an artificial start event for a given process takes on values from an initial event for the given process; and adding artificial end events to the events associated with each of the processes in the input event table, wherein an artificial end event for the given process takes on values from a final event for the given process.

Some embodiments may further involve propagating, from specific events in the input event table that were generated by a specific process, at least the references to the related processes that are non-empty to subsequent events in the input event table that were generated by the specific process.

Some embodiments may further involve splitting an entry for an event in the input event table into two entries for two distinct events, wherein the two distinct events represent two state changes that have a common timestamp.

IX. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
    persistent storage containing information relating to states of a set of processes, related processes, and events generated by the set of processes; and
    one or more processors configured to:
        generate, based on the information contained in the persistent storage, an event table, wherein the event table contains a plurality of entries, wherein each of the plurality of entries associates event identifiers, process identifiers of processes that generated the events, timestamps of times when the events occurred, states of the processes at the times when the events occurred, and references to any related processes, and wherein generating the event table comprises:
            deriving, for a particular process of the processes, a process instance trace in the event table that includes two or more of the events in the event table, arranged in time order, that were generated by the particular process,
            adding an artificial start event to the process instance trace, wherein the artificial start event is created by copying values from an initial event of the process instance trace and includes an attribute indicating that the artificial start event is artificial, and
            adding an artificial end event to the process instance trace, wherein the artificial end event is created by copying values from a final event of the process instance trace and includes an attribute indicating that the artificial end event is artificial;
        receive a request specifying the particular process of the processes;
        generate, from the event table, nodes and edges of a graph, wherein the particular process and related processes of the particular process are represented by entity nodes, and wherein particular process events are represented by event nodes; and
        provide, in response to the request, a representation of the graph.

2. The system of claim 1, wherein the entity nodes are annotated with respective process identifiers, wherein the event nodes are annotated with respective event identifiers, wherein generating the nodes and the edges of the graph comprises:
    generating, from the event table, a first set of edges between the nodes of the graph, wherein the first set of edges are between the entity nodes and the event nodes for which the particular process events represented by the event nodes either: were generated by the particular process represented by the entity nodes, or refer to the related processes of the particular process represented by the entity nodes; and
    generating, from the event table, a second set of edges between the nodes of the graph, wherein the second set of edges are between pairs of the event nodes that: were generated by a common process, and were sequential events according to those of the timestamps that are associated with each pair.

3. The system of claim 2, wherein the one or more processors are further configured to:
    generate, from the event table, a third set of edges between the nodes of the graph, wherein the third set of edges are between further pairs of entity nodes for which associated processes are related.

4. The system of claim 2, wherein the representation of the graph is received by a client device, and wherein reception of the representation of the graph causes the client device to display, on a graphical user interface, the nodes and any edges therebetween as specified by the representation, and wherein the one or more processors are further configured to:
    generate a compound entity node representing the particular process and a second particular process;
    identify, from the event table, a subset of events that were generated by the particular process or the second particular process while they were related; and
    generate, from the event table, a third set of edges between the nodes of the graph, wherein the third set of edges are between further pairs of event nodes representing the subset, in which the subset of events that were generated by the particular process or the second particular process while they were related occurred sequentially according to those of the timestamps that are associated with each further pair.

5. The system of claim 1, wherein the processes include one or more of incidents, problems, tasks, or change requests related to use of technology.

6. The system of claim 1, wherein the persistent storage also includes a snapshot record table and an audit record table, wherein the snapshot record table contains information relating to current states of the processes and current references to current related processes, wherein the audit record table contains information relating to state changes of the processes, and wherein the one or more processors are further configured to:

generate the event table based on the snapshot record table and the audit record table.

7. The system of claim 6, wherein generating the event table based on the snapshot record table and the audit record table comprises:
generating an input event table that has a plurality of input entries, wherein each of the plurality of input entries associates subsets of the event identifiers, the process identifiers, the timestamps, the states, and the references to any related processes in accordance with the snapshot record table and the audit record table; and
assigning the input event table to be the event table.

8. The system of claim 7, wherein the one or more processors are further configured to:
propagate, from specific events in the input event table that were generated by a specific process, at least the references to any related processes that are non-empty to subsequent events in the input event table that were generated by the specific process.

9. The system of claim 8, wherein the one or more processors are further configured to:
split an entry for an event in the input event table into two entries for two distinct events, wherein the two distinct events represent two state changes that have a common timestamp.

10. A computer-implemented method comprising:
generating, based on information contained in a persistent storage, an event table, wherein the persistent storage contains information relating to states of a set of processes, related processes, and events generated by the set of processes, wherein the event table contains a plurality of entries, wherein each of the plurality of entries associates event identifiers, process identifiers of processes that generated the events, timestamps of times when the events occurred, states of the processes at the times when the events occurred, and references to any related processes, and wherein generating the event table comprises:
deriving, for a particular process of the processes, a process instance trace in the event table that includes two or more of the events in the event table, arranged in time order, that were generated by the particular process,
adding an artificial start event to the process instance trace, wherein the artificial start event is created by copying values from an initial event of the process instance trace and includes an attribute indicating that the artificial start event is artificial, and
adding an artificial end event to the process instance trace, wherein the artificial end event is created by copying values from a final event of the process instance trace and includes an attribute indicating that the artificial end event is artificial;
receiving a request specifying the particular process;
generating, from the event table, nodes and edges of a graph, wherein the particular process and related processes of the particular process are represented by entity nodes, and wherein particular process events are represented by event nodes; and
providing, in response to the request, a representation of the graph.

11. The computer-implemented method of claim 10, wherein the entity nodes are annotated with respective process identifiers, wherein the event nodes are annotated with respective event identifiers, and wherein generating the event table further comprises:
generating, from the event table, a first set of edges between the nodes of the graph, wherein the first set of edges are between the entity nodes and the event nodes for which the particular process events represented by the event nodes either: were generated by the particular process represented by the entity nodes, or refer to the related processes of the particular process represented by the entity nodes; and
generating, from the event table, a second set of edges between the nodes of the graph, wherein the second set of edges are between pairs of the event nodes that: were generated by a common process, and were sequential events according to those of the timestamps that are associated with each pair.

12. The computer-implemented method of claim 11, further comprising:
generating, from the event table, a third set of edges between the nodes of the graph, wherein the third set of edges are between further pairs of entity nodes for which associated processes are related.

13. The computer-implemented method of claim 10, wherein the persistent storage also includes a snapshot record table and an audit record table, wherein the snapshot record table contains information relating to current states of the processes and current references to current related processes, wherein the audit record table contains information relating to state changes of the processes, the computer-implemented method further comprising:
generating the event table based on the snapshot record table and the audit record table.

14. The computer-implemented method of claim 13, wherein generating the event table based on the snapshot record table and the audit record table comprises:
generating an input event table that has a plurality of input entries, wherein each of the plurality of input entries associates subsets of the event identifiers, the process identifiers, the timestamps, the states, and the references to any related processes in accordance with the snapshot record table and the audit record table; and
assigning the input event table to be the event table.

15. The computer-implemented method of claim 14, further comprising:
propagating, from specific events in the input event table that were generated by a specific process, at least the references to any related processes that are non-empty to subsequent events in the input event table that were generated by the specific process.

16. The computer-implemented method of claim 14, further comprising:
splitting an entry for an event in the input event table into two entries for two distinct events, wherein the two distinct events represent two state changes that have a common timestamp.

17. An article of manufacture including a non-transitory computer-readable medium, having stored thereon program instructions that, upon execution by a computing system, cause the computing system to perform operations comprising:
generating, based on information contained in a persistent storage, an event table, wherein the persistent storage contains information relating to states of a set of processes, related processes, and events generated by the set of processes, wherein the event table contains a plurality of entries, wherein each of the plurality of entries associates event identifiers, process identifiers of processes that generated the events, timestamps of times when the events occurred, states of the processes at the times when the events occurred, and references to any related processes, and wherein generating the event table comprises:
  deriving, for a particular process of the processes, a process instance trace in the event table that includes two or more of the events in the event table, arranged in time order, that were generated by the particular process,
  adding an artificial start event to the process instance trace, wherein the artificial start event is created by copying values from an initial event of the process instance trace and includes an attribute indicating that the artificial start event is artificial, and
  adding an artificial end event to the process instance trace, wherein the artificial end event is created by copying values from a final event of the process instance trace and includes an attribute indicating that the artificial end event is artificial;
receiving a request specifying the particular process;
generating, from the event table, nodes and edges of a graph, wherein the particular process and related processes of the particular process are represented by entity nodes, and wherein particular process events are represented by event nodes; and
providing, in response to the request, a representation of the graph.

18. The article of manufacture of claim 17, wherein the entity nodes are annotated with respective process identifiers, wherein the event nodes are annotated with respective event identifiers, the operations further comprising:
  generating, from the event table, a first set of edges between the nodes of the graph, wherein the first set of edges are between the entity nodes and the event nodes for which the particular process events represented by the event nodes either: were generated by the particular process represented by the entity nodes, or refer to the related processes of the particular process represented by the entity nodes; and
  generating, from the event table, a second set of edges between the nodes of the graph, wherein the second set of edges are between pairs of the event nodes that: were generated by a common process, and were sequential events according to those of the timestamps that are associated with each pair.

* * * * *